(12) United States Patent
Cross et al.

(10) Patent No.: US 11,758,974 B2
(45) Date of Patent: Sep. 19, 2023

(54) ARTICLE OF FOOTWEAR WITH THERMOFORMED SIPED SOLE STRUCTURE

(71) Applicant: NIKE, Inc., Beaverton, OR (US)

(72) Inventors: Tory M. Cross, Portland, OR (US); John Hurd, Lake Oswego, OR (US); Cassidy R. Levy, West Linn, OR (US); Matthew D. Nordstrom, Portland, OR (US); James Zormeir, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 82 days.

(21) Appl. No.: 17/486,905

(22) Filed: Sep. 27, 2021

(65) Prior Publication Data
US 2022/0007784 A1 Jan. 13, 2022

Related U.S. Application Data

(63) Continuation of application No. 16/428,929, filed on May 31, 2019, now Pat. No. 11,129,437.
(Continued)

(51) Int. Cl.
| | |
|---|---|
| *A43B 13/12* | (2006.01) |
| *A43B 13/14* | (2006.01) |
| *A43B 13/04* | (2006.01) |
| *A43D 35/00* | (2006.01) |
| *B29D 35/00* | (2010.01) |
| *B29D 35/12* | (2010.01) |

(Continued)

(52) U.S. Cl.
CPC ............ *A43B 13/141* (2013.01); *A43B 13/04* (2013.01); *A43B 13/12* (2013.01); *A43D 35/00* (2013.01); *B29D 35/0054* (2013.01); *B29D 35/122* (2013.01); *B29K 2023/083* (2013.01); *B29K 2075/00* (2013.01)

(58) Field of Classification Search
CPC ..... A43B 13/023; A43B 13/12; A43B 13/122; A43B 13/125; A43B 13/127
USPC ......................................................... 36/30 R
See application file for complete search history.

(56) References Cited

U.S. PATENT DOCUMENTS

| | | | |
|---|---|---|---|
| 3,680,527 A | 8/1972 | Barker et al. | |
| 5,319,866 A * | 6/1994 | Foley | A43B 7/14 36/31 |

(Continued)

FOREIGN PATENT DOCUMENTS

EP    3131745 A1    2/2017

*Primary Examiner* — Marie D Bays
(74) *Attorney, Agent, or Firm* — Quinn IP Law

(57) ABSTRACT

An article of footwear includes an upper coupled to a sole structure. The upper has a ground facing surface, and opposing medial and lateral sidewalls disposed on and extending from opposite medial and lateral sides of the ground facing surface. The sole structure is formed from a plurality of non-coextensive, thermoplastic foam layers, where each layer extends across a portion of the ground facing surface of the upper. These layers include at least a first foam layer and a second foam layer. The first foam layer has a different hardness and/or density than the second foam layer. Each of the first foam layer and the second foam layer extends into direct contact with, and is directly adhered to the lateral sidewall and the medial sidewall of the upper, and the first foam layer is secured to the second foam layer via an adhesive or a thermal weld.

13 Claims, 15 Drawing Sheets

Related U.S. Application Data

(60) Provisional application No. 62/678,616, filed on May 31, 2018.

(51) Int. Cl.
  *B29K 23/00*  (2006.01)
  *B29K 75/00*  (2006.01)

(56) References Cited

U.S. PATENT DOCUMENTS

| | | | | |
|---|---|---|---|---|
| 6,115,945 A * | 9/2000 | Ellis, III | ............... | A43B 13/148 |
| | | | | 36/102 |
| 6,609,312 B1 * | 8/2003 | Ellis, III | ............... | A43B 13/145 |
| | | | | 36/25 R |
| 6,658,766 B2 * | 12/2003 | Kraeuter | ............... | A43B 7/1445 |
| | | | | 36/102 |
| 6,668,470 B2 * | 12/2003 | Ellis, III | ................. | A43B 5/00 |
| | | | | 36/25 R |
| 6,789,331 B1 * | 9/2004 | Ellis, III | ................ | A43B 13/18 |
| | | | | 36/114 |
| 7,631,440 B2 | 12/2009 | Keen et al. | | |
| 8,266,827 B2 | 9/2012 | Dojan et al. | | |
| 8,875,418 B2 | 11/2014 | Long | | |
| 9,609,917 B2 | 4/2017 | Dojan et al. | | |
| 9,713,362 B2 | 7/2017 | Farris et al. | | |
| 9,788,609 B2 | 10/2017 | James et al. | | |
| 10,149,513 B1 * | 12/2018 | Eldem | ................. | A43B 13/187 |
| 2003/0079375 A1 * | 5/2003 | Ellis, III | ............... | A43B 13/145 |
| | | | | 36/31 |
| 2004/0250447 A1 * | 12/2004 | Ellis, III | ................... | F04F 5/04 |
| | | | | 36/114 |
| 2005/0217145 A1 * | 10/2005 | Miyauchi | ............. | A43B 13/181 |
| | | | | 36/27 |
| 2005/0246922 A1 * | 11/2005 | Gibert | .................... | A43B 13/10 |
| | | | | 36/27 |
| 2007/0240332 A1 * | 10/2007 | Ellis, III | ............... | A43B 13/143 |
| | | | | 36/30 R |
| 2008/0216355 A1 * | 9/2008 | Becker | ................... | A43B 17/00 |
| | | | | 36/102 |
| 2009/0090027 A1 * | 4/2009 | Baudouin | ............ | A43B 7/1495 |
| | | | | 602/23 |
| 2009/0307925 A1 * | 12/2009 | Pfister | .................... | A43B 7/223 |
| | | | | 36/43 |
| 2012/0240428 A1 | 9/2012 | Knoll | | |
| 2012/0297641 A1 * | 11/2012 | Pfister | ................. | B29D 35/142 |
| | | | | 36/43 |
| 2014/0130270 A1 | 5/2014 | Baudouin et al. | | |
| 2014/0283412 A1 * | 9/2014 | Elder | .................... | A43B 13/16 |
| | | | | 36/102 |
| 2015/0089839 A1 | 4/2015 | James et al. | | |
| 2015/0237957 A1 * | 8/2015 | Cross | ................... | A43B 13/186 |
| | | | | 36/30 R |
| 2015/0342300 A1 * | 12/2015 | Cin | ...................... | A43B 13/127 |
| | | | | 36/103 |
| 2017/0150778 A1 * | 6/2017 | Youngs | ................ | A43B 1/0072 |
| 2017/0258178 A1 * | 9/2017 | Cross | .................... | A43B 13/14 |
| 2018/0125155 A1 | 5/2018 | Kirupanantham et al. | | |
| 2018/0368516 A1 * | 12/2018 | Mason | .................... | B32B 3/266 |
| 2019/0037970 A1 * | 2/2019 | Klug | ................. | A43B 23/0235 |
| 2019/0116924 A1 * | 4/2019 | Darby | .................... | A43B 3/128 |
| 2019/0365029 A1 * | 12/2019 | Cross | ................... | B29D 35/065 |
| 2019/0365044 A1 * | 12/2019 | Cross | .................... | A43B 13/12 |
| 2019/0366667 A1 * | 12/2019 | Cross | .................... | A43B 13/32 |

\* cited by examiner

US 11,758,974 B2

ARTICLE OF FOOTWEAR WITH THERMOFORMED SIPED SOLE STRUCTURE

CROSS REFERENCE TO RELATED APPLICATIONS

The present is a continuation of U.S. patent application Ser. No. 16/428,929, filed on 31 May 2019 and which is expected to issue as U.S. Pat. No. 11,129,437, and which claims the benefit of priority from U.S. Provisional Patent No. 62/678,616, filed on 31 May 2018. Both referenced applications are hereby incorporated by reference in their entirety.

TECHNICAL FIELD

The present disclosure relates to an article of footwear with a siped sole structure that is thermoformed directly to an upper.

BACKGROUND

Articles of footwear typically have at least two major components, an upper that provides the enclosure for receiving the wearer's foot, and a sole secured to the upper that is the primary contact to the ground or playing surface. In conventional footwear construction, a sole structure may be molded into its final shape through a process such as compression molding or injection molding. Following this, the sole structure may be adhered to an upper, such as by applying an adhesive or cement to both the final sole, and to a strobel portion of an upper and securing the components together.

By manufacturing the article of footwear in this manner, certain designs may be prevented through the constraints presented when molding the sole. For example, molding undercuts are typically avoided (i.e., where an undercut is a void in the final part that is created by a portion of the mold that may impede the molded part from being freely removed from the molding cavity). Likewise, molding a multi-material geometry may be difficult or impossible to control if the various materials are, for example, layered within protrusions or other isolated features.

DETAILED DESCRIPTION

Figure 1:
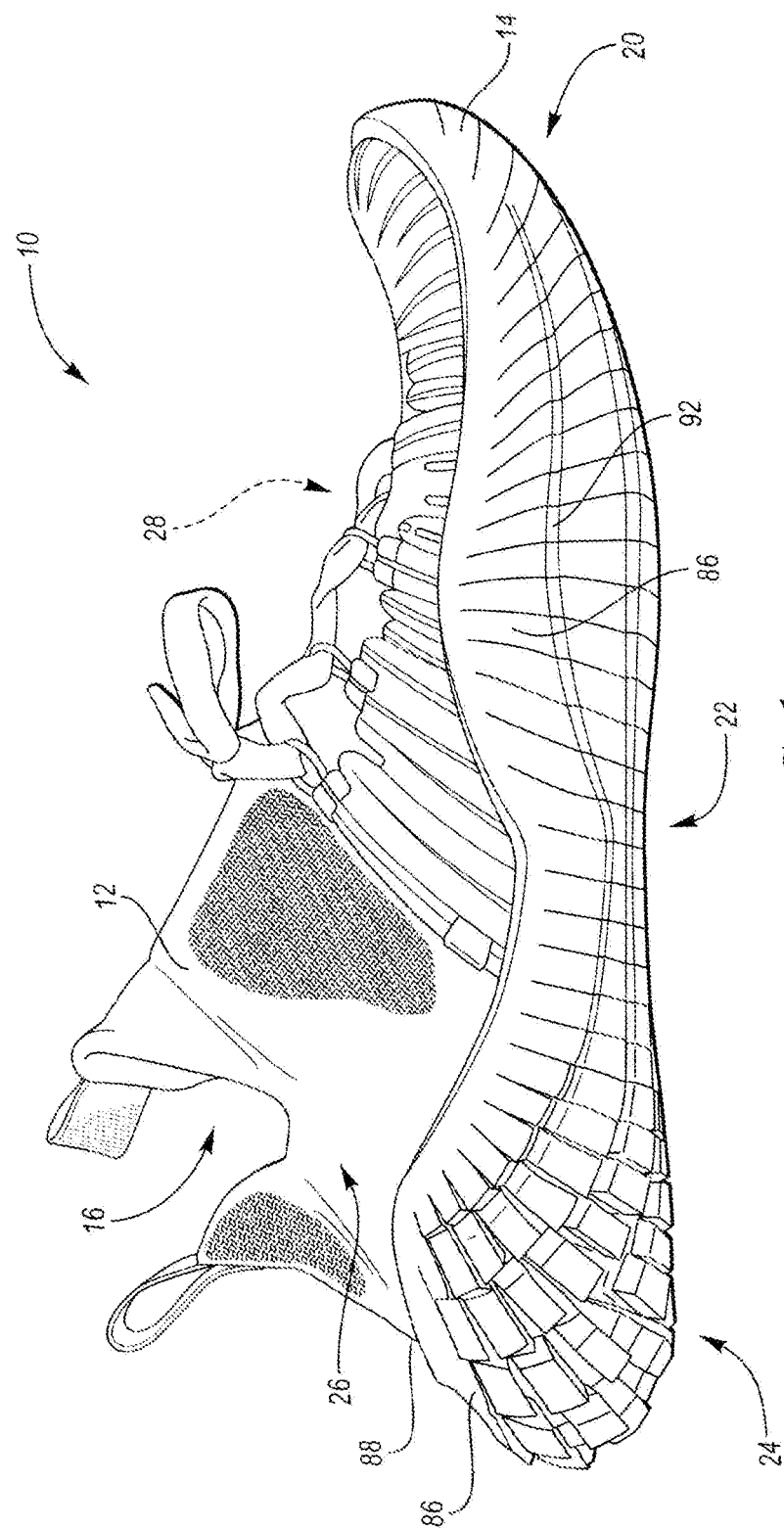
FIG. 1 is a schematic side view of an article of footwear with a thermoformed sole structure.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The present disclosure describes an article of footwear, method of manufacture, and intermediate sole structure that provides unique design advantages, both visually and in performance by creating certain sole geometry and structure while molding the intermediate sole structure, and by creating other sole geometry and structural attributes when separately thermoforming the intermediate sole structure to the upper.

The present designs may utilize siping and surface contouring within the intermediate sole structure to: create various protuberances extending out from the sole structure; create unique splaying designs; alter sole stiffnesses; and/or induce/alter various directional flexibility. Furthermore, in some embodiments, the intermediate sole structure may have a multi-material, layered construction that can then result in layered protuberances, locally altered cushioning properties, etc. Such designs, as described herein may generally be cost prohibitive and/or impossible to form through conventional, straight-from-the-mold sole manufacturing techniques.

According to the present disclosure, an article of footwear includes an upper and a sole structure that is thermoformed to the upper. The upper has a ground facing surface, and opposing medial and lateral side walls disposed on opposite sides of the ground facing surface. The sole structure has an inner surface adhered to the upper and an outer surface that is opposite the inner surface.

The sole structure includes a thermoplastic base layer that defines the inner surface of the sole structure. The sole structure further includes a thermoplastic outer layer integrally formed with the base layer. The outer layer has a plurality of protuberances, where each protuberance has an outer face that defines a portion of the outer sole surface. The outer layer further includes a plurality of splayed sipes extending across a portion of the sole structure, each splayed sipe generally extends between at least two adjacent protuberances. In some embodiments, one or more of the sipes may extend approximately perpendicular to other sipes. Likewise, in some embodiments, the plurality of protuberances may extend continuously between opposite medial and lateral portions of the sole structure.

In some embodiments, the outer face of each of the plurality of protuberances may comprise a skin having a density that is greater than an average density of the outer layer. In such a design, the protuberance may deform during the thermoforming such that at least a portion of the plurality of protuberances have a base portion with a cross-sectional area that is greater than a cross-sectional area of the respective protuberance at the outer face.

In some embodiments, the sole structure may comprise a first material having a pigment of a first color, and a second material having a pigment of a second color. The first material and second material are integrally molded in a layered, abutting arrangement between the inner surface and the outer surface. In some configurations, the terminus for at least a portion of the plurality of sipes is located within the first material such that the sipe extends through a portion of the first material and entirely through the second material. The first and second materials may both comprise a common polymer, such as ethylene-vinyl acetate.

In an embodiment, a sole structure for an article of footwear may include a thermoplastic base layer that defines an inner surface operative to be secured to a portion of an upper, and further defines a concave recess for receiving a portion of the upper. The inner surface including a central region operative to be secured to a ground facing surface of the upper and opposing sidewalls operative to be secured to opposite medial and lateral side walls of the upper. A thermoplastic outer layer is integrally formed with the base layer and includes a plurality of protuberances and a plurality of splayed sipes. Each protuberance has an outer face that defines a portion of an outer sole surface. Additionally, each splayed sipe extends across a portion of the sole structure and between at least two adjacent protuberances.

In an embodiment, a method of manufacturing an article of footwear includes cutting a plurality of sipes into an outer surface of a pre-formed, foamed thermoplastic sole structure that has both an inner surface and an opposite outer surface. An adhesive may be applied to the inner surface of the pre-formed sole structure and the sole structure is heated to permit forming. The heated sole structure is positioned adjacent to a ground-facing surface of a lasted upper, and then is thermoformed against the lasted upper to draw the adhesive into contact with the ground-facing surface of the upper, and such that at least a portion of the pre-formed sole structure bends into contact with a sidewall of the upper.

In general, the thermoforming process may cause the some or all of the plurality of sipes to splay. In some embodiments, thermoforming includes applying a force to the outer surface of the sole structure using a flexible sheet in contact with the outer surface. This force may be applied by creating at least one of a vacuum on a first side of the flexible sheet or a positive pressure on a second side of the sheet.

In some embodiments, the method may further include molding the pre-formed sole structure through at least one of a compression molding or an injection molding process. In some designs, this may involve molding a first material in an abutting relationship with a second material. Such a multi-material molding process may comprise placing the first material adjacent to the second material within a first mold, and heating the mold such that the first material and second material expand to fill the mold. This may result in the creation of an expanded sole structure. The expanded sole structure may then be removed from the first mold and compression molded into the pre-formed sole structure in a second mold that is smaller than the first mold.

Finally, in some embodiments, an intermediate sole structure for an article of footwear (i.e., intermediate in the sense that the sole has been substantially constructed, though has not been finally formed to the upper) may include a foamed thermoplastic sole component that comprises both a foamed thermoplastic base layer and a foamed thermoplastic outer layer. These two layers may be integrally formed, though a plurality of sipes may extend through the outer layer and terminate at the base layer. In general, the thermoplastic sole component has an inner surface defined by the base layer, an opposite, outer surface defined by the outer layer, and a thickness defined between the inner surface and the outer surface. In some embodiments, the inner surface is substantially planar and is operative to be adhered to a ground-facing surface of an upper, and the thickness is smaller at a peripheral edge of the sole component than within a central region.

In some embodiments, the thickness of the sole structure at an intermediate region that is located between the peripheral edge and the central region may be greater than at both the peripheral edge and at the central region.

In some embodiments, the sole component may comprise a first material defining at least a portion of the inner surface, and a second material defining at least a portion of the outer surface. The first material and the second material meet at a boundary that is not coincident with a boundary between the base layer and the outer layer. In some embodiments, this material boundary may lie within the outer layer.

In some embodiments, each of the plurality of sipes may extend into the sole component in a common direction that is substantially orthogonal to the inner surface.

The sole component may have a lateral dimension in at least a portion of the sole that is larger than a corresponding lateral dimension of an upper intended to be coupled with the sole structure. A sole component of this type then comprises a lateral portion operative to bend into contact with a lateral sidewall of the upper and a medial portion operative to bend into contact with a medial sidewall of the upper. Furthermore, in some embodiments, the sole component comprises a heel portion that is operative to bend into contact with a heel sidewall of the upper.

"A," "an," "the," "at least one," and "one or more" are used interchangeably to indicate that at least one of the item is present; a plurality of such items may be present unless the context clearly indicates otherwise. All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range. Each value within a range and the endpoints of a range are hereby all disclosed as separate embodiment. The terms "comprises," "comprising," "including," and "having," are inclusive and therefore specify the presence of stated items, but do not preclude the presence of other items. As used in this specification, the term "or" includes any and all combinations of one or more of the listed items. When the terms first, second, third, etc. are used to differentiate various items from each other, these designations are merely for convenience and do not limit the items.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

Other features and aspects will become apparent by consideration of the following detailed description and accompanying drawings. Before any embodiments of the disclosure are explained in detail, it should be understood that the disclosure is not limited in its application to the details or construction and the arrangement of components as set forth in the following description or as illustrated in the drawings. The disclosure is capable of supporting other embodiments and of being practiced or of being carried out in various ways. It should be understood that the description of specific embodiments is not intended to limit the disclosure from covering all modifications, equivalents and alternatives falling within the spirit and scope of the disclosure. Also, it is to be understood that the phraseology and terminology used herein is for the purpose of description and should not be regarded as limiting.

Referring to the drawings, wherein like reference numerals are used to identify like or identical components in the various views, FIG. 1 schematically illustrates an article of footwear 10 that includes an upper 12 coupled with a sole structure 14. In the current embodiment, the article of footwear 10 is shown in the form of an athletic shoe that may be suitable for walking or running. Concepts associated with the present article of footwear 10, may also be applied to a variety of other athletic footwear types, including but not limited to baseball shoes, basketball shoes, cross-training shoes, cycling shoes, football shoes, soccer shoes, sprinting shoes, tennis shoes, and hiking boots.

As commonly understood, the upper 12 is a portion of the article of footwear 10 that at least partially defines an interior cavity 16 that is adapted to receive a foot of a wearer. The upper 12 may include one or more provisions for securing and/or tensioning the upper 12 around the foot of the wearer (e.g., laces, straps, buckles, bands, and the like).

As will be discussed in greater detail below, the sole structure 14 may be permanently attached to one or more portions of upper 12 and may generally extend between the upper 12 and the ground (i.e., when the article 10 is worn in a typical manner). The sole structure 14 may be operative to attenuate ground reaction forces (e.g., cushion the foot), provide traction, enhance stability, and/or influence the motions of the foot.

For reference purposes, article of footwear 10 upper 12 may be divided generally along a longitudinal axis (heel-to-toe) into three general regions: a forefoot region 20, a midfoot region 22, and a heel region 24. Forefoot region 20 generally includes portions of article of footwear 10 corresponding with the toes and the joints connecting the metatarsals with the phalanges. Midfoot region 22 generally includes portions of article of footwear 10 corresponding with an arch area of the foot. Heel region 24 generally corresponds with rear portions of the foot, including the calcaneus bone. Article of footwear 10 also includes a lateral side 26 and a medial side 28, which extend through each of forefoot region 20, midfoot region 22, and heel region 24 and correspond with opposite sides of article of footwear 10. More particularly, lateral side 26 corresponds with an outside area of the foot (i.e., the surface that faces away from the other foot), and medial side 28 corresponds with an inside area of the foot (i.e., the surface that faces toward the other foot). Forefoot region 20, midfoot region 22, heel region 24, lateral side 26, and medial side 28 are not intended to demarcate precise areas of article of footwear 10. Rather, forefoot region 20, midfoot region 22, heel region 24, lateral side 26, and medial side 28 are intended to represent general areas of article of footwear 10 to aid in the following discussion.

When referring to different portions of the article of footwear 10 it is also common for aspects to be defined relative to a ground surface upon which the sole structure 14 sits when worn on a user's foot in a traditional upright manner. For example, as generally shown in the exploded view provided in FIG. 2, the sole structure 14 (or various layers or components included in the sole structure 14) may have an upper, or inner surface 30 that faces the wearer's foot, and a lower, or outer surface 32 that is mostly between the ground and the inner surface 30 of the sole 14. Likewise, the upper 12 may have a ground-facing surface 34 that is generally provided along an underside of the wearer's foot and is in contact with the sole structure 14. In some embodiments, the ground-facing surface 34 of the upper 12 may be defined by a strobel, however, in a more preferred embodiment, ground-facing surface 34 may be integrally and/or seamlessly formed with a lateral sidewall 36 and a medial sidewall 38 of the upper 12, while omitting the use of a strobel.

An example of an upper construction that may be used with the present article of footwear 10 is described in U.S. Patent Application Pub. No 2017/0311672 (the '672 application), which was filed on 20 Jul. 2017, and is hereby incorporated by reference in its entirety. The '672 application generally describes a knitted upper that has a multi-layer fabric construction that resembles a sock or "bootie." As described, the upper may have selective reinforcement or stiffening portions within the heel, lateral sidewall 36, and/or medial sidewall 38. These stiffened portions may be provided, for example, by incorporating stiffening panels between adjacent knitted layers, or by thermally treating regionally provided thermoplastic yarns within the knit to alter a material property of the fabric.

The present sole structure 14 may accomplish unique geometries by being thermoformed to the upper 12 as a final, or near-final step in the manufacturing process. In doing so, sole undercuts and geometries may be created that are impractical and/or cost prohibitive to produce by direct molding (e.g., via injection or compression molding). Furthermore, the present techniques provide for a more custom fit between a sole structure 14 and a lasted upper. The present techniques and designs are a departure from conventional sole manufacturing, which typically involves injection or compression molding the sole structure into its final shape.

Figure 3:
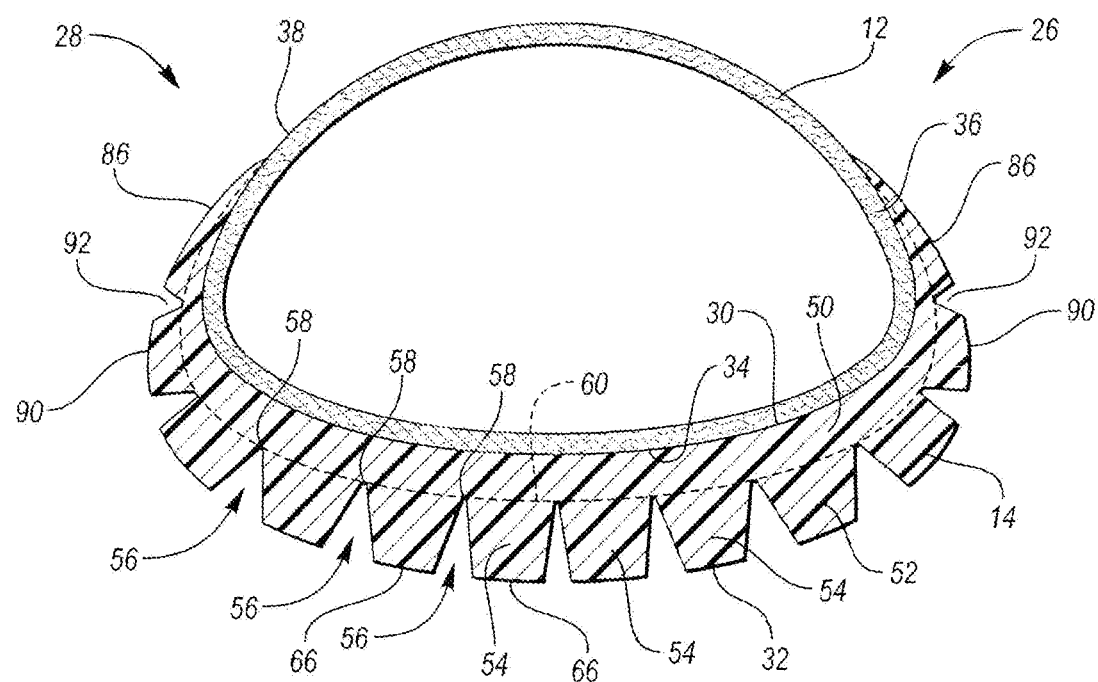
FIG. 3 is a schematic, cross-sectional view of an article of footwear with a thermoformed sole, such as taken along line 3-3 of FIG. 2.

Referring to the cross-sectional view provided in FIG. 3, in one configuration, the sole structure 14 may generally comprise a thermoplastic base layer 50 that is integrally formed/molded with a thermoplastic outer layer 52. The thermoplastic base layer 50 may define the inner surface 30 of the sole structure 14, and may provide structure and continuity to the sole structure 14. Conversely, the thermoplastic outer layer 52 may define a plurality of protuberances 54 that are separated from each other via a plurality of sipes 56. In general, each sipe 56 may originate from a terminus 58 located on the boundary 60 between the thermoplastic base layer 50 and the thermoplastic outer layer 52. Said another way, each sipe 56 may lie entirely within the thermoplastic outer layer 52 (i.e., the termini 58 may serve to generally define the boundary 60).

As used herein, a sipe, sipes, and siping is intended to refer to thin cuts in a surface of the sole structure 14. Sipes are typically formed via a secondary process after the foamed sole structure 14 is molded. In some embodiments, they may be formed by cutting the sole structure 14 to a controlled depth, such as with a hot knife or laser. In general, the width of the cut is limited to the width of the tool used to make the cut.

As further shown in FIG. 3, when the sole 14 is thermoformed to the upper 12, some or all of the plurality of sipes 56 may splay as a result of the bending that occurs in the base layer 50. As will be discussed below, in an embodiment where a flat inner surface 30 is molded to a substantially contoured/curved upper 12, a substantial majority of the sipes 56 may experience some amount of splaying during the thermoforming process. In general, the thermoforming process involves heating up at least a portion of the foamed thermoplastic, forming it to a surface (e.g., via vacuum forming), and then cooling the thermoplastic to maintain it in the deformed state.

Figure 4:
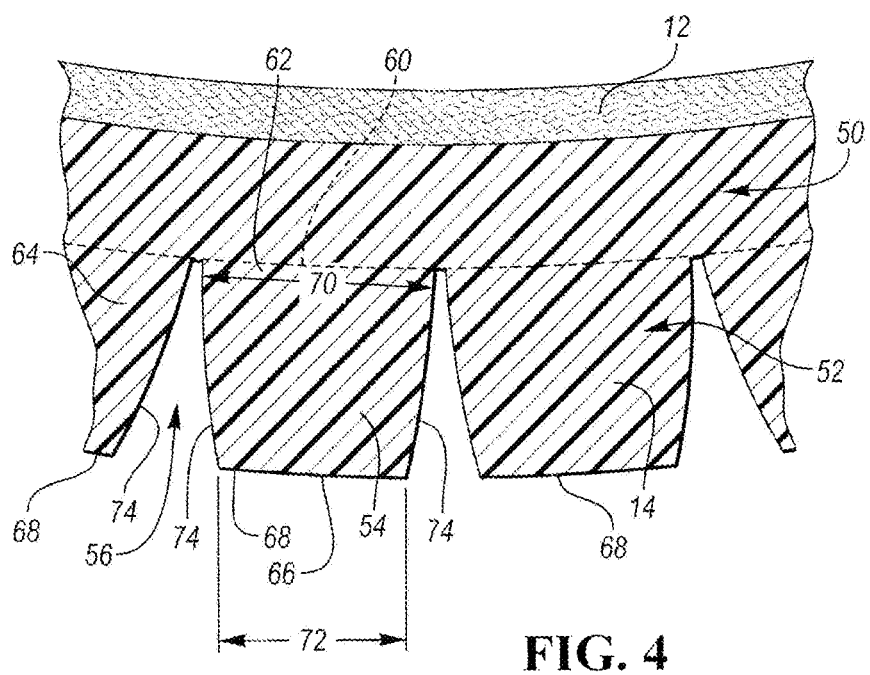
FIG. 4 is a schematic, partially enlarged cross-sectional view of an article of footwear such as shown in FIG. 3

Referring to FIG. 4, while the bending of the sole structure 14 may cause a plurality of the sipes 56 to splay and open up, it may also have an effect on the protuberances 54 that are coupled with the bent base layer 50. More particularly, the bending in the base layer 50 may impart a tensile stress within a base portion or root 62 of the protuberance 54. This tensile stress may then cause a corresponding dimensional expansion in the foam 64. In one configuration, however, an outer face 66 of the protuberance 54 may comprise a skin 68 that resists dimensional expansion to a greater degree than the foam 64. In one embodiment this resisted expansion may result in a dimension 70 of the base portion 62 of the protuberance 54 being greater than a similar dimension 72 of (or at) the outer face 66. In an embodiment, the dimension 70, 72 may be, for example, a cross-sectional area.

In general, the skin 68 may be a byproduct of the molding process used to create the foamed sole structure 14. This skin 68 may generally have a density that is greater than an average density of the foamed outer layer, and/or a density that is greater than a density of the directly adjacent foam 64. In effect, this skin 68 may provide a toughened outer surface that may be akin to a more traditional outsole surface. The plurality of skinned outer faces 66 may collective define some or all of the outer surface 32 of the sole structure 14. Furthermore, because the sipes 56 are cut after the skin 68 has formed, the skin 68 only exists on the outer face 66 of the protuberance 54, and not on the sidewalls 74 of the protuberance 54 (i.e., the walls abutting the sipe 56).

Figure 5:
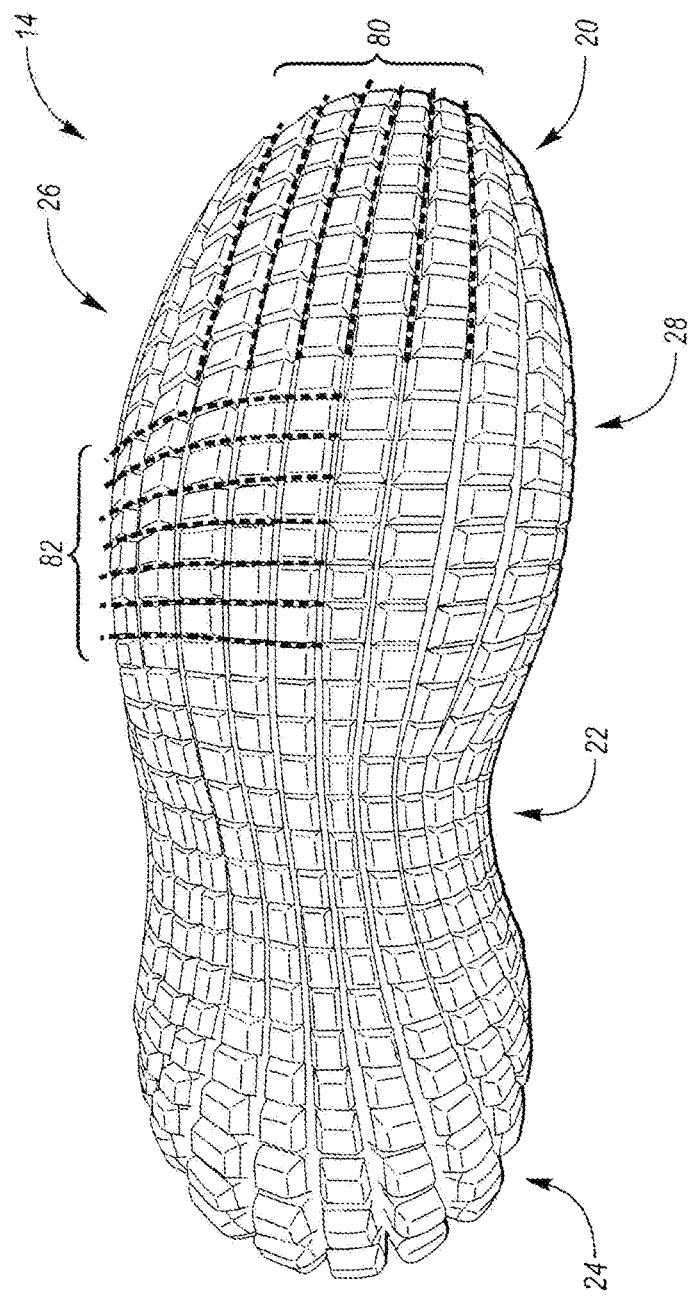
FIG. 5 is a schematic, bottom view of a ground-contacting surface of a sole structure for an article of footwear.

FIG. 5 schematically illustrates an embodiment of a sole structure 14 that includes a first plurality of splayed sipes 80 extending in a generally longitudinal direction between the forefoot region 20 and heel region 24, and a second plurality of splayed sipes 82 extending in a generally lateral direction between the lateral side 26 and the medial side 28 of the sole 14. As shown, each of the first plurality of splayed sipes 80 intersects each of the second plurality of splayed sipes 82. It should be noted, that additional sipes may be included, which are not part the first plurality or second plurality of sipes, though may have similar attributes. A design such as shown in FIG. 5 allows the sole structure 14 to achieve a more natural motion response, by reducing any bending restrictions about one or more longitudinal and/or lateral axes.

Figure 2:
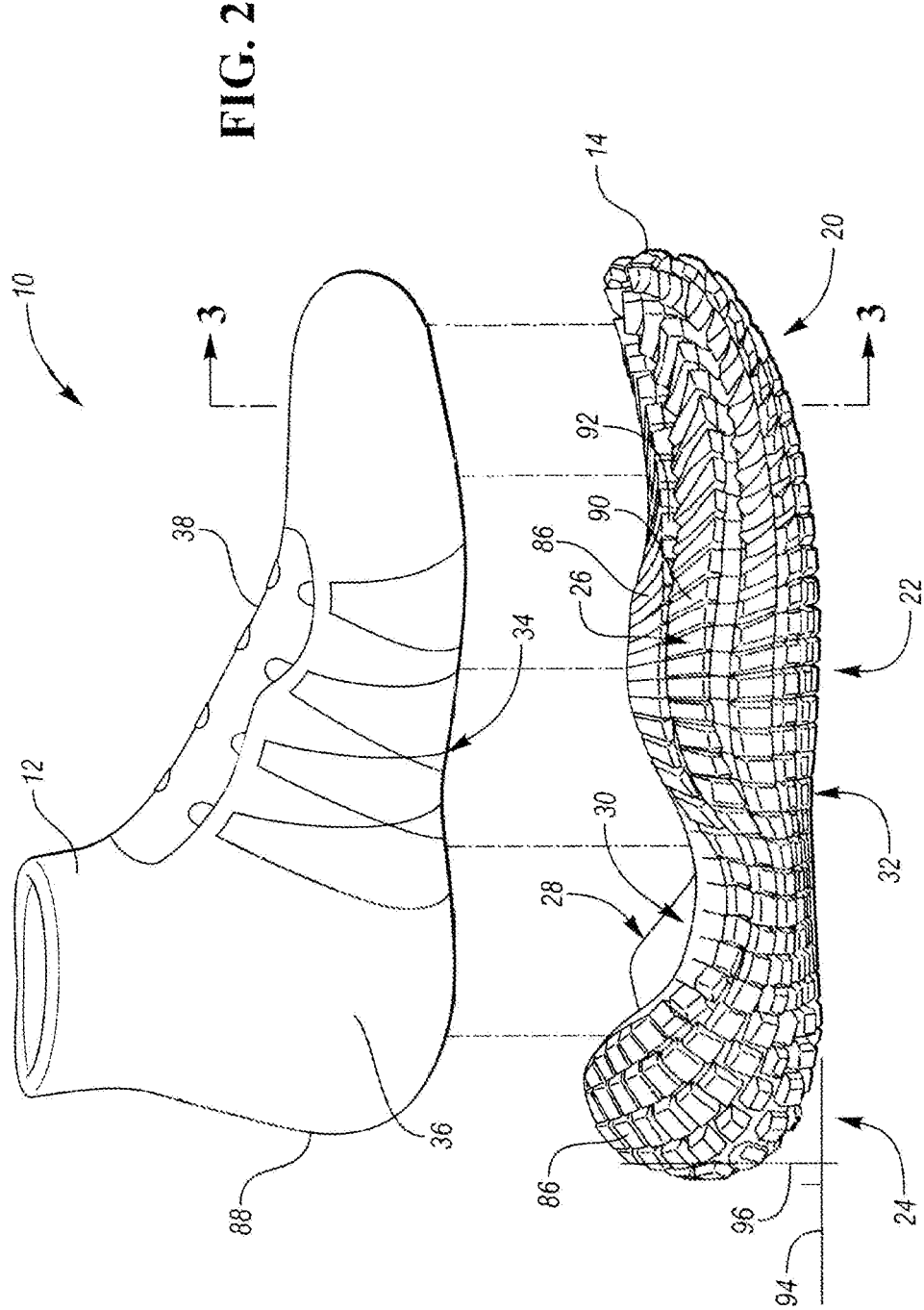
FIG. 2 is a schematic, partially exploded view of an article of footwear with a thermoformed sole structure.
Figure 6:
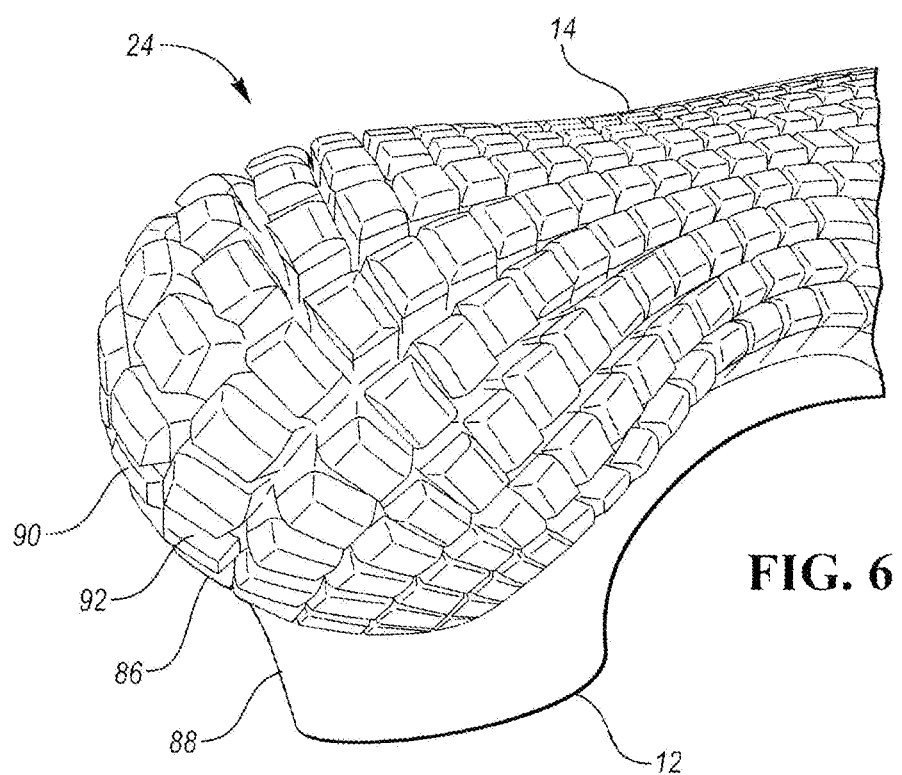
FIG. 6 is a schematic lower rear perspective view of a sole structure for an article of footwear that is formed to the heel portion of the upper.

In an embodiment, the sole pattern illustrated in FIG. 5 may be carried through onto one or more upwardly extending portions 86 of the sole structure 14. These upwardly extending portions may be in contact with and/or adhered to the lateral sidewall 36, the medial sidewall 38, and/or a heel wall portion 88 (shown in FIGS. 1-2) of the upper 12. For example, in an embodiment, a first sole portion 86 may extend up a portion of the lateral sidewall 36 of the upper 12 and may include a first plurality of sidewall protuberances 90, such as shown in FIG. 2. Similarly, a second sole portion 86, may also extend up a portion of the medial sidewall 38 of the upper 12, and may include a second plurality of protuberances (i.e., similar to that shown in FIG. 2, though on the opposite side). Additionally, in some embodiments, a sole portion 86 may upwardly extend into contact with a heel wall portion 88, such as generally shown in FIGS. 1, 2, and 6. In any of these upwardly extending portions 86, one or more sipes 92 may extend outward from the base layer 50 and along the sole structure 14 in a substantially longitudinal direction. In an embodiment, these sidewall sipes 92 may be oriented such that one or more protuberances 54, 90 are positioned between the sipe 92 and a ground plane 94 (when the shoe is in a neutral, upright position resting on the ground plane such as shown in FIG. 2, and "between" contemplates an examination along a datum 96 that is normal to the ground plane 94 and that intersects the sipe 92).

Traditional molding techniques would have difficulty if attempting to directly mold a sole design such as shown in FIG. 5. More particularly, the one or more sidewall sipes 92 may present a significant molding undercut problem if such a design was attempted to be molded directly. A molding undercut results when a portion of the mold interferes with a part's ability to be withdrawn from a final mold. In some situations, a small undercut may be tolerable if the material can yield without tearing or plastically deforming when the part is removed from the mold. If the undercut is too large, then additional molding complexities must be used to create the geometry, such as removable slides, or other complex multi-part mold assemblies (which generally prevent bulk manufacture). Presently disclosed designs and techniques overcome this problem by forming the splayed siping voids during a post-molding, thermoforming step (i.e., also used to adhere the sole structure 14 to the upper 12) and by not directly molding them into the sole 14.

In some embodiments, the pattern of the plurality of sipes 56 extending across the sole structure may be designed to provide certain application-specific benefits. For example, the sole structure 14 shown in FIGS. 1-6 may enable a natural motion foot response that may be similar to training barefoot. Furthermore, because of the splayed sipes on the outer surface, the sole structure 14 may further accommodate and allow natural foot expansion (laterally and/or longitudinally) that occurs during and through a ground impact and push off.

Figure 7:
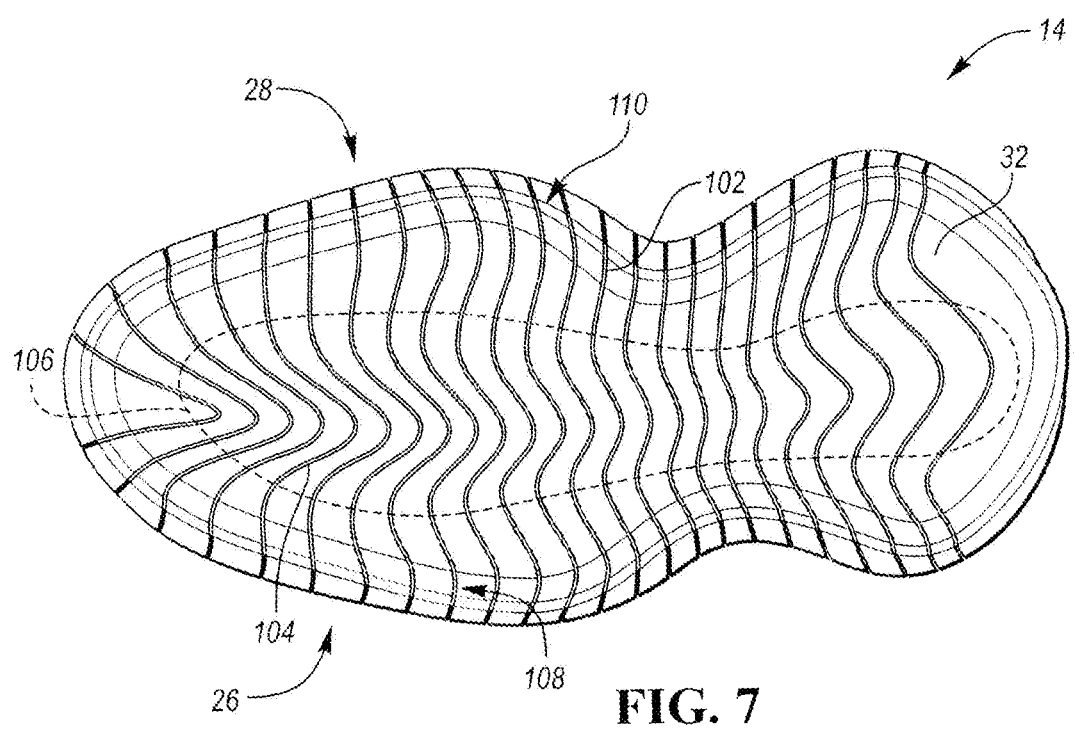
FIG. 7 is a schematic bottom view of a pre-formed sole structure for an article of footwear.

FIG. 7 schematically illustrates another embodiment of a sole structure 14. This design generally includes a plurality of sipes 102 that each extend between a lateral side 26 and a medial side 28 of the sole structure 14. Each sipe 102 may incorporate a longitudinal deflection component 104 within a central region 106 of the sipe 102 that, to varying degrees, resembles a "U" or "V." Such a design may provide increased edge stability by not including any longitudinal siping (or sipes with a dominant longitudinal component) near the lateral or medial edge portions 108, 110. Conversely, the longitudinal deflection component 104 within the central region 106 may permit foot roll and/or lateral foot expansion through a ground impact.

Figure 8:
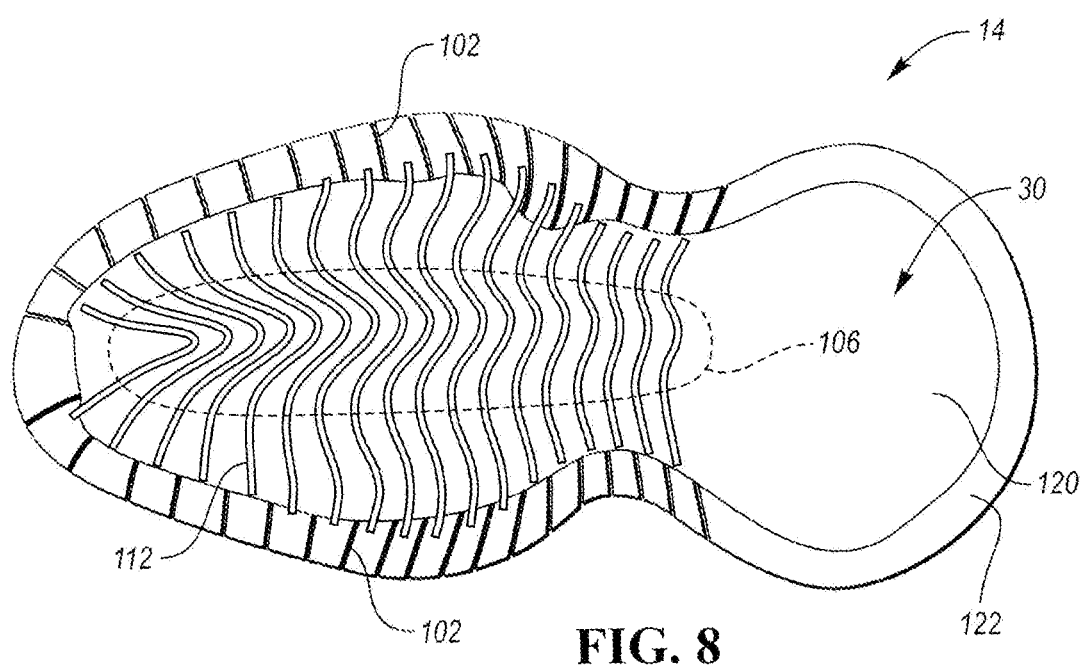
FIG. 8 is a schematic top view of the pre-formed sole structure of FIG. 7.

In some embodiments, the flexibility of the sole structure 14 may be further increased by incorporating or cutting one or more sipes 112 into the inner surface 30 of the sole structure 14, such as shown in FIG. 8. To ensure that the sole 14 remains waterproof and/or provides adequate protection against foreign objects on the ground, it is preferable for any sipes 112 cut into the inner surface 30 to not intersect with any sipes 102 cut into the outer surface 32. Doing so would result in a potential hole or opening extending entirely through the sole structure 14. As shown in FIGS. 7-8, in one configuration, the sipes 112 cut into the inner surface 30 may be staggered along a longitudinal axis relative to the sipes 102 cut into the outer surface 32.

While FIGS. 5 and 7 illustrate two potential siping patterns, other patterns and unique geometries are similarly possible. For example, in an embodiment, the sole structure 14 may include a plurality of sipes that all extend in a substantially longitudinal direction. In another embodiment, the sipes may extend diagonally from each of the medial and lateral edges. In a variation, these sipes may terminate prior to reaching the opposite edge.

The current sole construction techniques may be used to create differing sole geometries that, for example, provide a better natural motion response and/or customized stiffness properties (e.g., lateral, edge, longitudinal, roll, flex, impact, etc.). Additionally, by exposing interior foam via the plurality of splayed sipes 56, the current sole construction techniques may also be used to create unique visual characteristics or other dimensional properties that may be extraordinarily difficult and/or impossible to create through traditional molding practices. More specifically, in one configuration, the sole structure 14 may be formed from a plurality of different materials that may be co-molded prior to cutting the plurality of sipes 56 and thermoforming to the upper 12.

Figure 9:
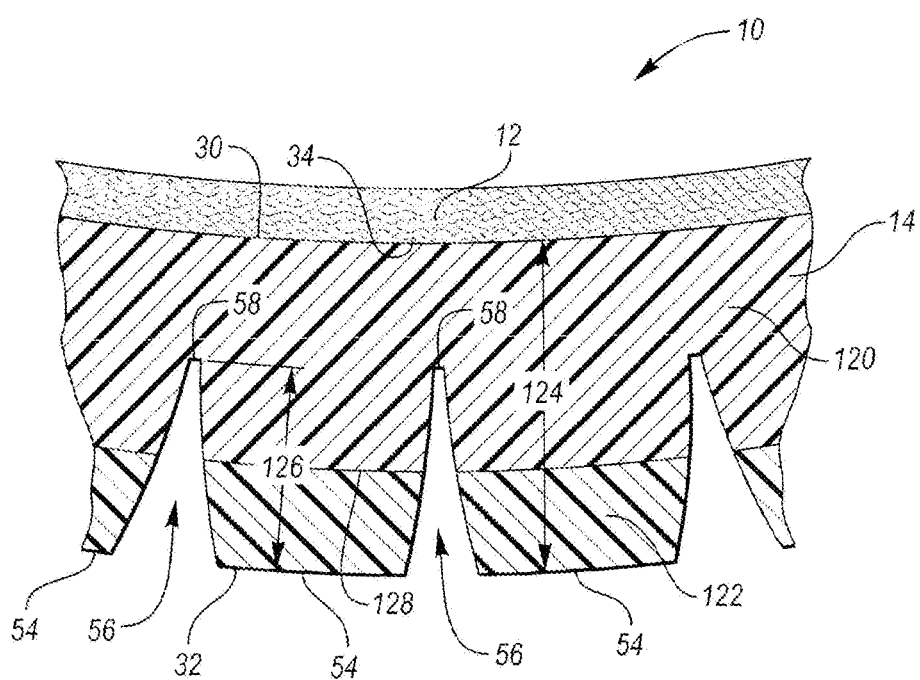
FIG. 9 is a schematic partial cross-sectional view of a thermoformed sole structure similar to FIG. 4, though illustrating a multi-material construction.

FIG. 9 schematically illustrates a cross-sectional view, similar to FIG. 4, which more clearly illustrates a plurality of different materials being used to form the sole structure 14. As shown, a first material 120 and a second material 122 may be integrally molded in a layered, abutting arrangement between the inner surface 30 and the outer surface 32. In one configuration, the terminus 58 for each of a plurality of sipes 56 may be located within the first material 120 such that the sipe extends through a portion of the first material 120 and further extends entirely through the second material 122. In doing so, the present design may provide a plurality of the protuberances 54 with a layered, multi-material construction. The extent and relative proportion of the materials 120, 122 within each protuberance may be controlled, for example, by varying the sole thickness 124 and/or the depth 126 of each sipe 56. While two materials are shown in FIG. 9, in other embodiments, the multi material construction may include three or more materials, or may vary in number across the sole structure 14.

In one configuration, each of the first material 120 and second material 122 may comprise a foamed polymer having a different density or hardness. For example, in an embodiment, the second material 122 may be comparatively softer and/or less dense then the first material 120. In such a design, each protuberance would still have relative root stability, provided by the harder, more dense inner material, while still maintaining an initial impact cushioning response via the softer material. In another embodiment, the ground-contacting second material 122 may be harder and/or more dense than the inner, first material 120 to provide improved resiliency and wear resistance. In still another embodiment, the inner, first material 120 (containing the terminus 58 and root portion 62 of the protuberances 54) and the outer, ground-contacting material 122 may be formed from comparatively harder and/or more dense materials (for the reasons stated above), and a third material may be disposed between the first material 120 and the second material 122, which may be comparatively softer than the first and second materials 120, 122 to provide an improved cushioning response.

In another configuration, the first material 120 and the second material 122 may be substantially similar in composition, except for the nature or composition of one or more pigments that are incorporated with the respective material. As mentioned above, the ability for the present sole structure 14 to expose internal sole materials, even while in a resting state, may provide a unique ability to vary the outwardly visible coloration and styling of the sole structure 14 through the use of color breaks or divisions 128 within each protuberance by altering the foam or foam layers used to form that protuberance. Finally, in an embodiment, both the material properties/hardnesses and the pigmentation/coloration of the first material 120 and the second material 122 may be different.

Figure 10:
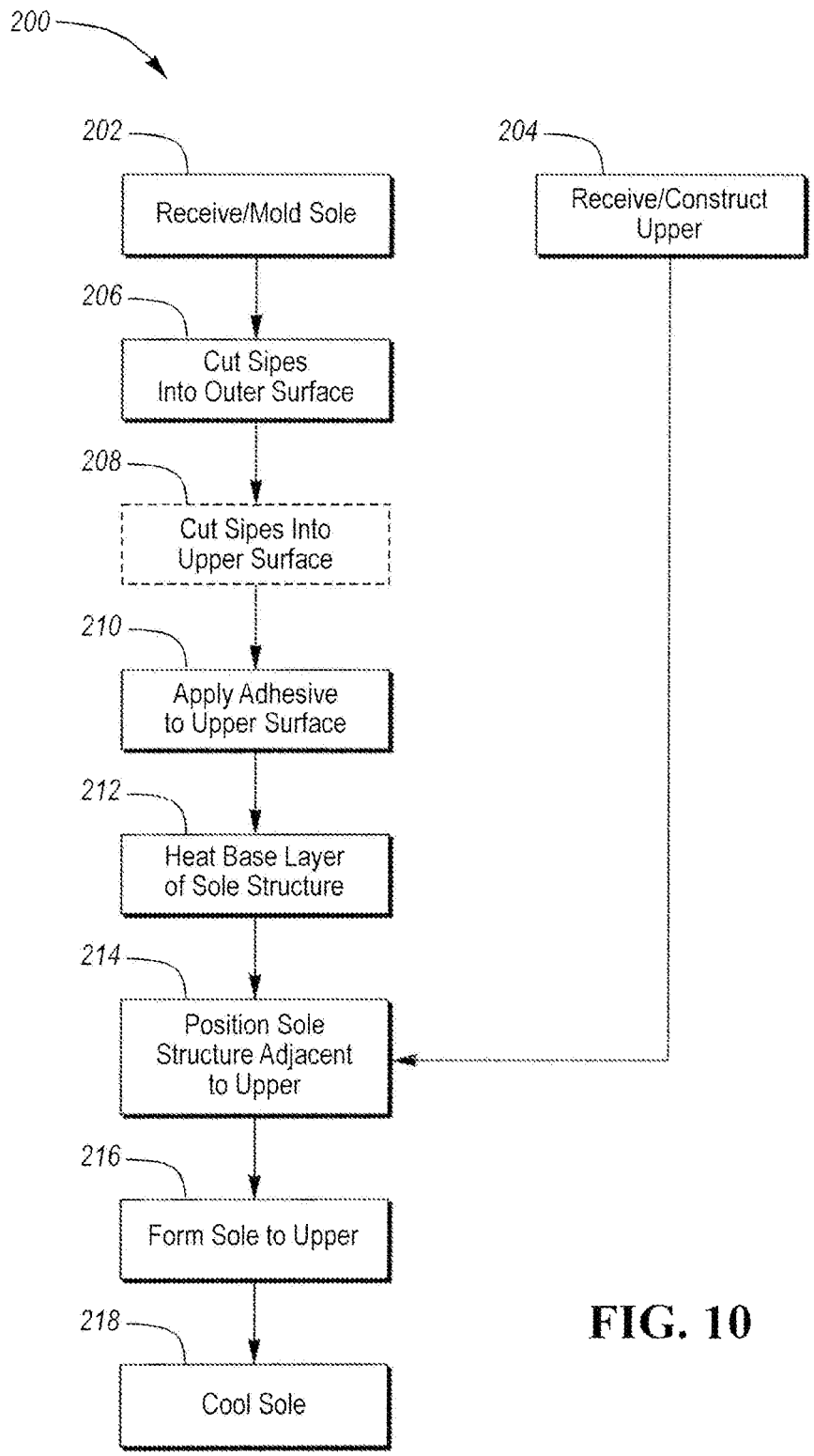
FIG. 10 is a schematic flow diagram illustrating a method of manufacturing an article footwear, similar to that shown in FIG. 1.

FIG. 10 schematically illustrates a method 200 of manufacturing an article footwear 10 similar to what is shown in FIG. 1. This method 200 generally begins by receiving, or molding a foamed thermoplastic sole structure at 202, and by receiving and/or constructing a lasted upper at 204. As discussed above, the lasted upper may be constructed by pulling one or more layers of tubular knit material onto a last, and then closing a toe seam, for example, using RF or ultrasonic welding techniques. In one configuration, the tubular knit material may include a plurality of thermoplastic fibers and one or more adjacent layers may at least partially fuse together and/or establish a neutral shape defined by the last, for example during a heat treating or thermoforming process applied to the upper 12. Likewise, in some embodiments, the tubular knit material may include one or more stiffening panels, or other features typical of a shoe, such as lace eyelets graphical embellishments, and the like. Further detail on the process for forming a strobel-less upper are explained in the '672 application mentioned above. While a strobel-less upper is preferred, in other embodiments, the upper 12 may be constructed in a standard manner by seaming a vamp an/or other shoe portions to a strobel.

In general, molding a foamed thermoplastic sole structure at 202 may involve converting a raw polymeric material, together with one or more plasticizers, blowing agents, pigments, or the like, into a foamed sole structure 14 using a heated and/or pressurized mold. The manner of manufacturing the sole structure 14 may include any one of: direct injection molding, injection molding a preform followed by compression molding the preform into a final shape, compression molding a preform from a bulk polymer and then compression molding the preform into a final shape, direct compression molding, or the like.

The materials used to form the sole structure 14 may generally include phylon (ethylene vinyl acetate or "EVA") and/or polyurethane ("PU") base resins. If EVA is used, it may have a vinyl acetate (VA) level between approximately 9% and approximately 40%. Suitable EVA resins include Elvax®, provided by E. I. du Pont de Nemours and Company, and Engage™, provided by the Dow Chemical Company, for example. In certain embodiments, the EVA may be formed of a combination of high melt index and low melt index material. For example, the EVA may have a melt index of from about 1 to about 50.

The EVA resin may be compounded to include various components including a blowing agent and a curing/crosslinking agent. The blowing agent may have a percent weight between approximately 10% and approximately 20%. The blowing agent is thermally decomposable and is selected from ordinary organic and inorganic chemical blowing agents. The nature of the blowing agent is not particular limited as long as it decomposes under the temperature conditions used in incorporating the foam into the virgin resin. Suitable blowing agents include azodicarboamide, for example.

In certain embodiments, a peroxide-based curing agent, such as dicumyl peroxide may be used. The amount of curing agent may be between approximately 0.6% and approximately 1.5%. The EVA may also include homogenizing agents, process aids, and waxes. For example, a mixture of light aliphatic hydrocarbons such as Struktol® 60NS, available from Schill+Seilacher "Struktol" GmbH, may be included to permit other materials or scrap EVA to be more easily incorporated into the resin. The EVA may also include other constituents such as a release agent (e.g., stearic acid), activators (e.g., zinc oxide), fillers (e.g., magnesium carbonate), pigments, and clays.

In embodiments that incorporate multiple materials, such as shown in FIG. 9, each material 120, 122 may be formed from a material that is compatible and readily bonds with the other material. For example, both materials 120, 122 may be formed from an EVA resin with suitable blowing agents, crosslinking agents, and other ancillary components, pigments, fillers, and the like. Other suitable materials for the first material 120 and the second material 122 will become readily apparent to those skilled in the art, given the benefit of this disclosure.

As noted above, the first material 120 may be formed of a material having a first color, while the second material 122 may be formed of a material having a second color that is different than the first color. First and second materials 120, 122 may also have different values for various physical properties, even if formed from the same base resin, in order to alter or enhance the performance characteristics of the footwear. For example, first and second materials 120, 122 may have different hardnesses, densities, specific gravities, or any other beneficial physical property. Other suitable physical properties for which the first and second portions may have different values will become readily apparent to those skilled in the art, given the benefit of this disclosure.

As seen in FIG. 9, a color line or boundary 128 is formed at the boundary or interface between the first material 120 and the second material 122 of sole structure 14. It is desirable to minimize the bleeding between the two different colors of the first material 120 and the second material 122, which can occur during the molding process. It is to be appreciated that the aesthetics of sole structure 14 are improved by minimizing bleeding during the manufacture of sole structure 14. Techniques to minimize bleeding, including the use of one or more peripheral molding flanges, are discussed in U.S. Patent Application Pub. No. US 2018/0133995, filed on 17 Nov. 2016, which is incorporated by reference in its entirety. It should further be appreciated that more than two portions/materials can be used to form the sole structure, which may introduce additional colors and additional performance characteristics to sole structure 14.

In one method of molding a multi-material sole structure 14 such as shown in FIG. 9, a first preform and a second preform may be formed to a general shape that is similar to the final desired shape (though not to final dimensions). In one embodiment, each preform may directly correspond to a different one of the first material 120 and second material 122, and may be created, for example, through injection or compression molding.

The first and second preforms may then be placed in an intermediate mold together, so that the first preform is in contact with the second preform. Heat is then supplied to the mold for a predetermined period of time. In one embodiment, the mold may be heated at a temperature of approximately 130° C. for approximately 15-20 minutes. This heating may cause first and second preforms to partially expand and fill the internal mold cavity and spill into any coupled molding overflow chambers. It is to be appreciated that the specific temperature and time period used to form the sole structure preform in the mold can be varied, in known fashion, depending on the particular EVA, or other material, used. After this heating step is complete, the mold is opened, and the sole structure preform may further expand in a known fashion after it is removed from the mold.

After the sole structure preform has stabilized and cooled to ambient temperature, the sole structure preform then may undergo a subsequent compression molding step in a second mold. This second mold may have an internal volume that is less than a volume of the cooled sole structure preform. Thus, when the preform is compression molded, it may be physically compressed to a smaller volume when the mold is closed. The second mold may then be heated for a predetermined period of time. In certain embodiments, the second mold may be heated to approximately 140° C. for approximately 15 minutes, thereby forming a sole structure of the desired size/shape. The specific temperatures and time periods used to heat the second mold can be varied, in known fashion, depending on the particular EVA, or other material, used.

While the second mold is still closed, it is cooled, allowing sole structure to fully cure and stabilize. In certain embodiments, the second mold is cooled in a closed condition for approximately 15 minutes until the temperature of second mold is below approximately 35° C. Following this, the mold may be opened and the sole structure removed.

Once the sole structure has been molded in step 202, a plurality of sipes may be cut into the outer surface 32 (at 206) and optionally cut into the inner surface (at 208). The plurality of sipes 56 may be cut, for example, using a blade, which may be heated to aid in creating a smooth cut with an acceptable surface finish on the sidewalls of the sipe. In another embodiment, one or more of the plurality of sipes 56 may be laser cut into the foam to a controlled depth. In some embodiments, each of the plurality of sipes may be cut to varying depths, dependent on the sole thickness, cushioning design objectives, and desired final sole appearance. In some embodiments, the stiffness and/or cushioning properties of any one or more protuberances (or of the sole in that local area) may be altered to meet different design objectives by varying the depth of the adjacent sipes (i.e., where deeper sipes may provide a less stiff sole structure with increased cushioning). If sipes are cut into the inner surface 30, it is preferable that they do not intersect with the sipes cut into the outer surface 32. In some embodiments, the sipes may all be cut in an orthogonal direction relative to the inner surface 30.

In one embodiment, the sipes may be cut such that they all extend into the outer surface 32 from a common direction. Such a design may increase manufacturing efficiency by eliminating any need to reorient a cutting tool for each sipe or each portion of a sipe. In an embodiment where the inner surface 30 is substantially flat/planar, this common cutting direction may be orthogonal to the inner surface 30. In another embodiment, one or more of the sipes maybe at an oblique angle relative to the inner surface 30. Making such an oblique cut may enable unique geometries to be created when the sole is thermoformed to the upper.

Figure 11:
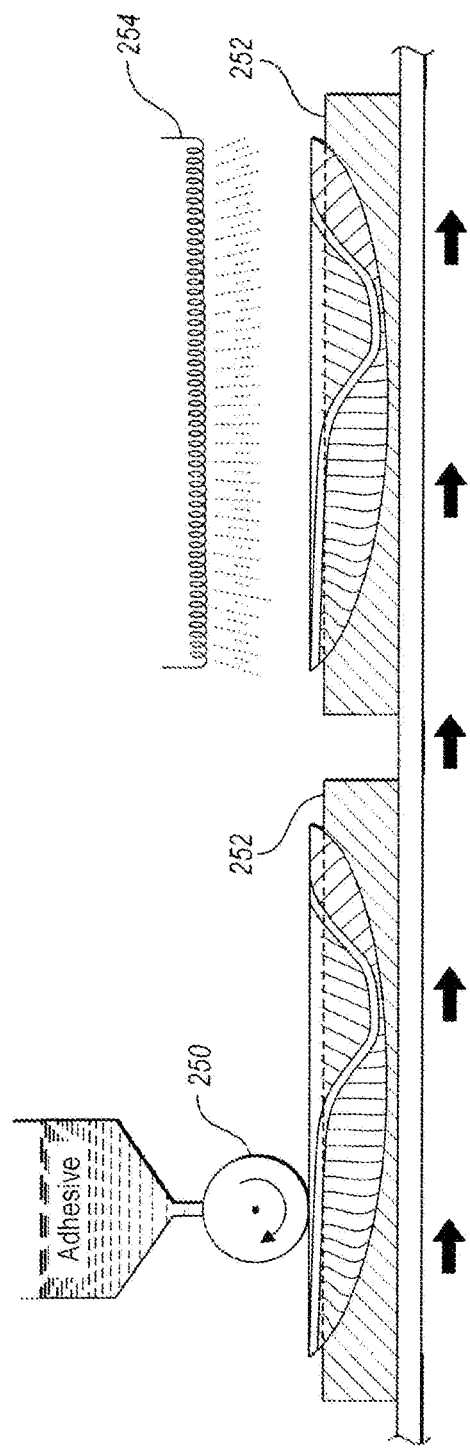
FIG. 11 is a schematic partial assembly diagram of a process for applying adhesive and heating a pre-formed sole structure.

Once the sole has been siped in steps 206 and 208, an adhesive may be applied to the inner surface 30 of the sole structure 14 at 210. The adhesive may be applied, for example, using a brush, spray, or roller applicator. To minimize any required complexity, the roller applicator may be best suited for applications where the inner surface 30 is substantially flat. In such a configuration, the roller 250 may be a single roller with a constant cylindrical cross-section, such as shown in FIG. 11, and the sole structure 14 may be cradled within a fixture 252 that resembles a lower mold. As an additional benefit of rolling, if any sipes are cut into the inner surface 30, such as shown in FIG. 8, then the roller applicator could most easily be controlled to avoid applying adhesive within the inner/upper sipes, and without the need to separately mask the sipes. In such an embodiment, the unadhered inner sipes may permit each sipe to serve as an expansion gap that may permit purely in-plane stretch and/or flexure of the sole. When combined with a strobel-less upper, such a stretch or flexure response may be even further unrestrained (i.e., where strobels are typically more restrictive than a strobel-less, all-knit upper would be).

Following the application of the adhesive at 210, the sole structure 14 may be heated to soften the thermoplastic foam (at 212), and particularly at least the thermoplastic base layer 50. As further shown in FIG. 11, in an embodiment, the heating may be performed by a radiant heating element 254 or convective heating nozzles (not shown) that apply thermal energy to only the inner surface 30 of the sole structure 14. As the outer layer 52 has already been siped through, the primary purpose of the heating is to soften the base layer 50 only to a point where it can be thermoformed to the upper. If the sole structure 14 is heated too much, then it may lose some structural integrity and/or its properties may change to an undesirable degree. As such, in a preferred embodiment, a temperature gradient should exist between the inner surface 30 and the outer surface 32. In one configuration, the fixture 252 upon which the sole structure 14 rests may serve as a heatsink to cool the outer layer 52 while the base layer 50 is being heated. Doing so may ensure that the outer layer 52 does not deform in any unintended ways while being thermoformed.

Figure 12:
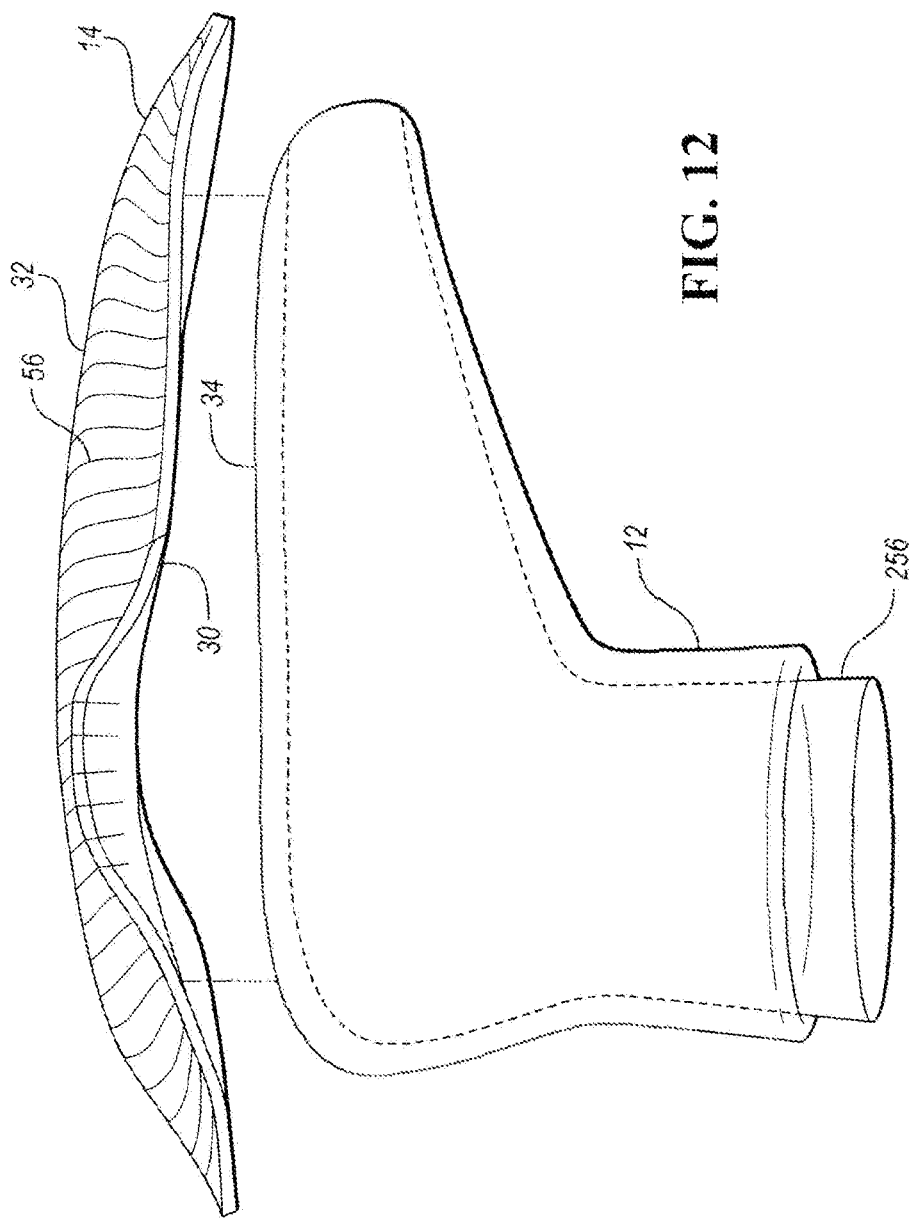
FIG. 12 is a schematic side view of a pre-formed sole structure provided adjacent to a ground facing surface of a lasted upper.

Referring again to FIG. 10, once the base layer 50 is softened to a point where it may be thermoformed (at 212), it may then be positioned adjacent to the ground-facing surface 34 of an upper 12 provided on a last 256 (at 214), such as shown in FIG. 12. Once in this position, the sole structure 14 may be urged into contact with the upper, such as by vacuum forming (at 216—in FIG. 10), where it may then be cooled (at 218) to retain its formed shape.

During the forming step 216, the softened sole structure 14 may be drawn into contact with the lasted upper 256, such as through the use of positive external pressure, negative internal pressure, compliant fixturing, or the like. In vacuum forming, the lasted upper 256 and sole structure 14 may be placed in their predefined arrangement under a compliant polymeric sheet. Once in position, a vacuum may be created under the sheet such that the sheet exerts a force against the sole structure 14 to urge it into contact with the upper 12. In doing so, the adhesive may be drawn into contact with the ground-facing surface of the upper and at least a portion of the pre-formed may bend into contact with a sidewall of the upper, such as shown in FIG. 3. The bending caused by the vacuum forming then causes the plurality of sipes to splay.

Figure 13:
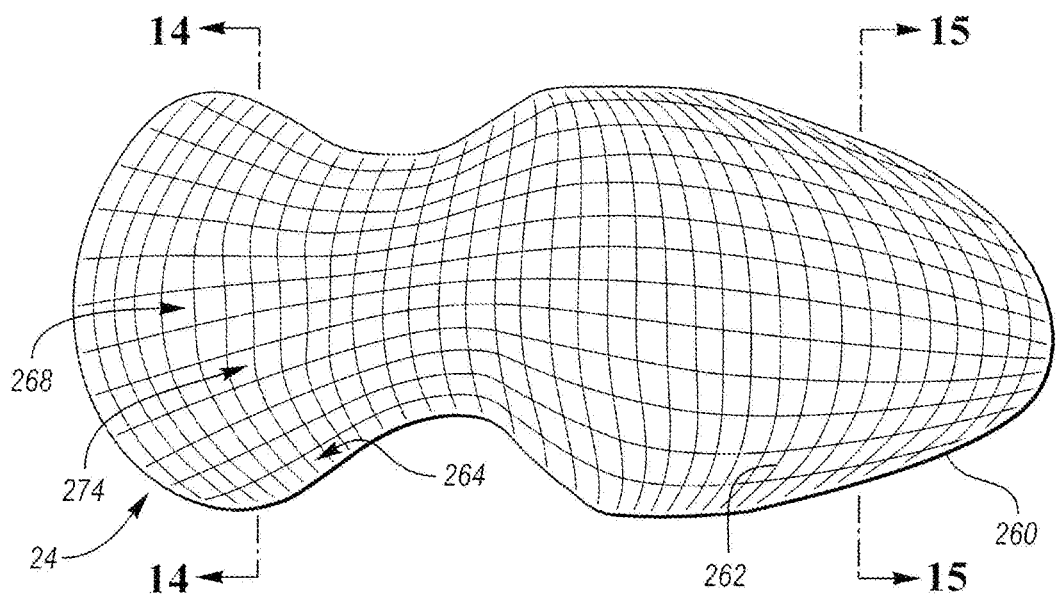
FIG. 13 is a schematic bottom view of a pre-formed sole structure for an article of footwear.
Figure 14:
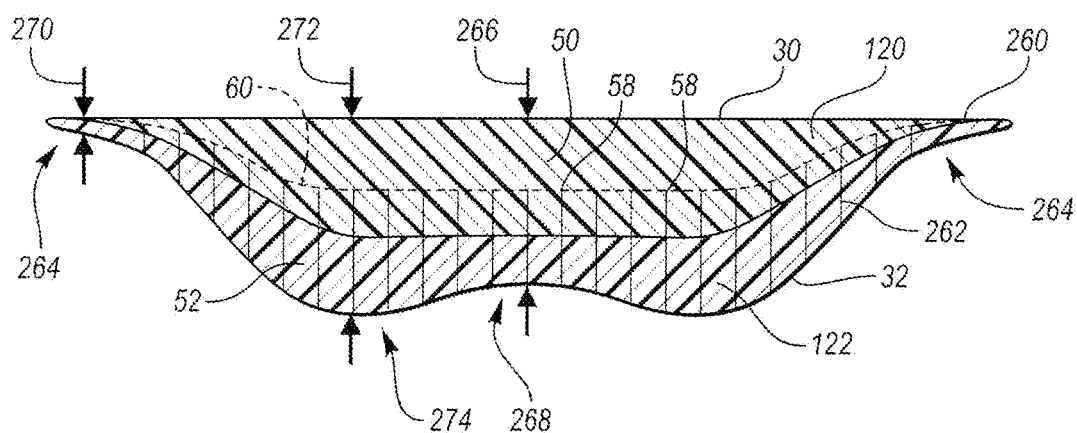
FIG. 14 is a schematic cross-sectional view of a pre-formed sole structure such as shown in FIG. 13 and taken along line 14-14.
Figure 15:
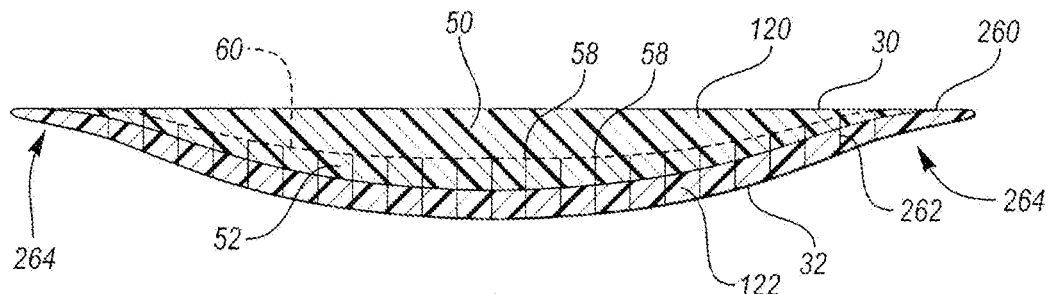
FIG. 15 is a schematic cross-sectional view of a pre-formed sole structure such as shown in FIG. 13 and taken along line 15-15.

FIGS. 13-15 schematically illustrate an embodiment of an intermediate sole structure 260 that may be used to create the final sole structure of FIGS. 2-3. The intermediate sole structure 260 (generally, sole structure 260) is generally of the form that follows the siping of step 206, shown in FIG. 10. As shown, the sole structure 260 has an outer surface 32 and an inner or inner surface 30 that is operative to be directly adhered to the upper 12. This intermediate sole structure 260 includes a plurality of sipes 262 extending inward from the outer surface 32, though are not yet splayed. As shown in FIGS. 14-15, based on the desired final geometry and required stability and/or cushioning across the sole, each sipe 262 may be cut to a different depth relative to the outer surface 32. Each sipe 262 may have a terminus 58, and the plurality of termini 58 may define a boundary 60 between the base layer 50 and the outer layer 52.

In the embodiment illustrated in FIGS. 13-15 the inner surface 30 may be substantially flat/planar. Conversely, the outer surface 32 may be substantially contoured while tapering to the inner surface 30 around a periphery 264 of the sole structure 260. In some embodiments, the thickness of the sole structure 260 may vary in an effort to control both the final design, including the amount of splay, and to control a cushioning response, stability, and traction of the final sole structure 14. For example, in one configuration, in an effort to promote uniform ground contact in the final sole structure the heel region 24 of the pre-form sole structure 260 may be dimensioned such that a sole thickness 266 within a center region 268 is greater than a sole thickness 270 at the periphery. Additionally, a sole thickness 272 taken within an intermediate region 274 between the center region 268 and the periphery 264 may be greater than both of the other two thicknesses 266, 270. In doing so, the final sole structure 14 may have a more flat ground contacting surface, as the center region 268 may end up protruding outward slightly while the intermediate region 274 may be drawn inward slightly and/or otherwise thinned due to the bending and Poisson's ratio of the material.

Similar to the sole 14 shown in FIG. 8, the sole in FIGS. 13-15 includes a multi material construction, whereby both a first material 120 and a second material 122 cooperate to form the inner surface 30 while the outer surface 32 is generally formed from only the second material 122. While the figures show a two-material construction, it may be equally possible to include additional materials that may form a portion of the outer surface 32, and/or of an interior region of the sole structure 260. As shown in FIGS. 14-15, in some configurations, at least a majority of the sipes 262 may extend entirely through the second material 122. In doing so, once the sipes 262 are splayed, multiple materials may be exposed, and may provide unique visual effects.

Figure 16:
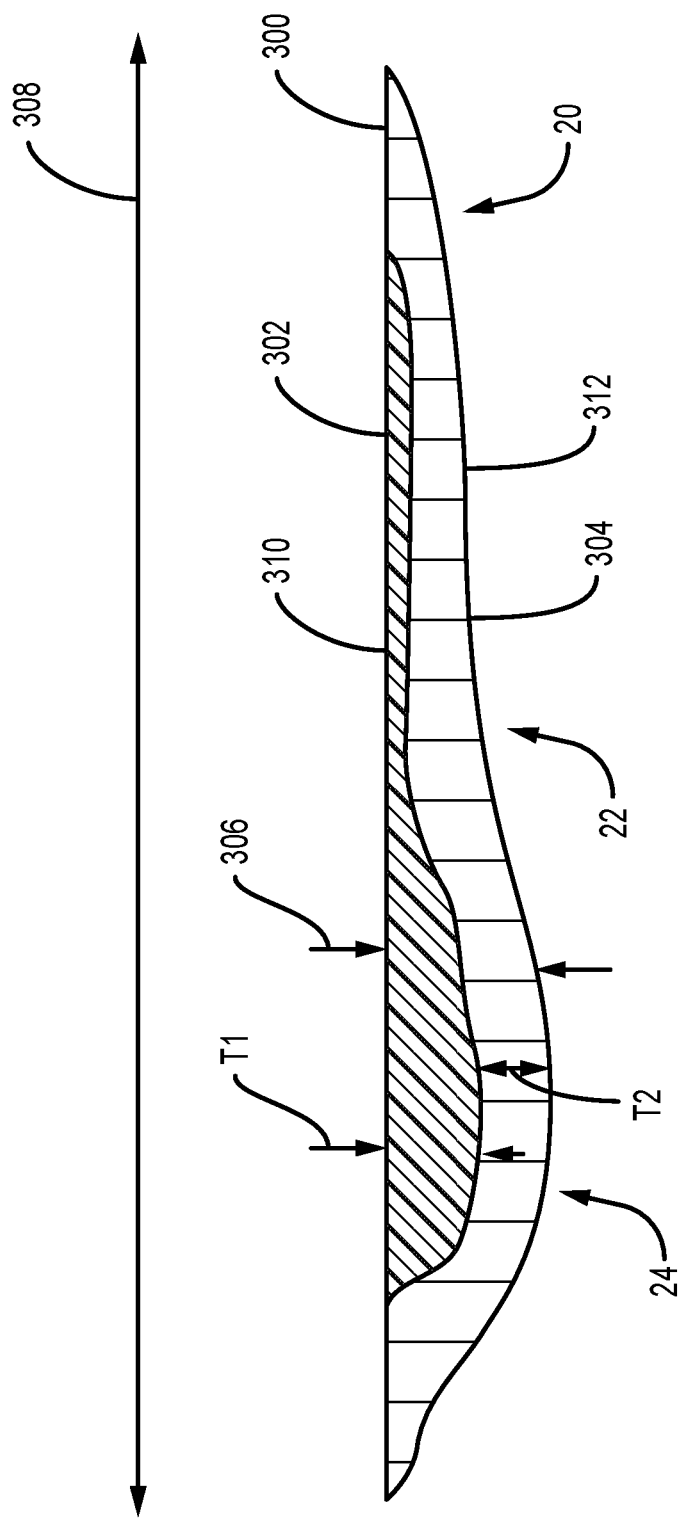
FIG. 16 is a schematic cross-sectional of a pre-formed sole structure with a variable thickness inlaid material, and taken along a longitudinal axis extending between a forefoot region and a heel region.

FIG. 16 illustrates a longitudinal cross-sectional view of a sole structure 300, which may be similar to the sole structure 260 shown in FIGS. 13-15. In this embodiment, a first material 302 may by inlaid into a second, comparatively harder material 304. In general, the inner, first material 302 may provide a softer ride for the wearer and/or may serve to absorb/attenuate more impact energy from the wearer than a comparatively harder material would. Conversely, the outer, second material 304 may provide more abrasion resistance and durability to the sole structure 300 while also providing structural containment to the comparatively softer inner material 302

As further illustrated in FIG. 16, the overall thickness 306 of the sole structure 300 may vary along a longitudinal length 308 to provide different applied force responses in different regions of the sole. In some configurations the thicknesses T1, T2 of the inner and outer materials 302, 304 may dimensionally vary along the length 308 in proportion to each other, and/or in proportion to the overall thickness T. In one configuration, the comparatively softer inner material 302 may be thicker within a heel region 24 to provide increase shock absorbing during heel strikes, while may be thinner (relative to the absolute thickness and/or as a proportion of the overall thickness) in the forefoot portion 20 to provide stability during a push-off. While FIG. 16 illustrates the inner material 302 extending across at least a portion of each of the heel region 24, midfoot region 22 and fore foot region 20, in some embodiments, the inner material 302 may only be located in the heel region 24. In other embodiments, the inner material 302 may only be located in the heel region 24 and in the midfoot region 22.

In one non-limiting example, the overall thickness T of the sole structure 300 may be greater at the sole heel portion 24 than at the sole forefoot portion 20. Specifically, the sole heel portion 24 may have a heel thickness HT defined from the inner surface 310 to the outer surface 320, and the sole forefoot portion 20 has a forefoot thickness FT defined from the inner surface 310 to the outer surface 320. The heel thickness HT is greater than the forefoot thickness FT in order to provide optimal cushioning for a hard heel striker.

The thickness T of the sole structure 300 may be greater at the sole heel portion 24 than at the midfoot portion 22. The sole midfoot portion 22 has a midsole thickness MT defined from the inner surface 310 to the outer surface 312. The heel thickness HT may be greater than midsole thickness MT in order to maximize cushioning at the sole heel portion 24 and maximizing comfort during a runner stride. The heel thickness HT may be greater than the midsole thickness and the forefoot thickness FT in order to maximize comfort during the entire heel-to-toe stride. For example, the thickness T of the sole structure 300 may continuously decrease from the sole heel portion 24 to the sole forefoot portion 20 to provide optimal cushioning while enhancing the energy return at the sole forefoot portion 20. In one example, the maximum sole thickness may range between twenty five (25) millimeters and ten (10) millimeters, and the minimum sole thickness MNT may range between the ten (10) millimeters and five (5) millimeters. These thickness ranges provide optimal cushioning at the sole heel portion 34 while enhancing the energy return at the sole forefoot portion 20.

For one configuration, the general material arrangement, the inner material 302 and the surrounding outer material 304 may be similar to that described in U.S. Pat. No. 7,941,938, which incorporated by reference in its entirety. The inner foam material 302 may have a lightweight, spongy feel. In one configuration, the resiliency of the foam material for the inner material 302 may be greater than 40%, greater than 45%, at least 50%, and in one aspect from 50-70%. Likewise, compression set may be 60% or less, 50% or less, 45% or less, and in some instances, within the range of 20 to 60%. The hardness (Durometer Asker C) of the inner foam material 302 may be, for example, 25 to 50, 25 to 45, 25 to 35, or 35 to 45, e.g., depending on the type of footwear. The tensile strength of the foam material may be at least 15 kg/cm2, and typically 15 to 40 kg/cm2. The elongation % is 150 to 500, typically above 250. The tear strength is 6-15 kg/cm, typically above 7. The inner sole material 302 may have lower energy loss and may be more lightweight than traditional EVA foams. As additional examples, if desired, at least some portion of inner sole material 302 may be made from foam materials used in the LUNAR family of footwear products available from NIKE, Inc. of Beaverton, Oreg. The properties (including ranges) of the foam material for any of the sole components described in this disclose enhances the support provided by sole structure 300 to the wearer's foot.

Figure 17:
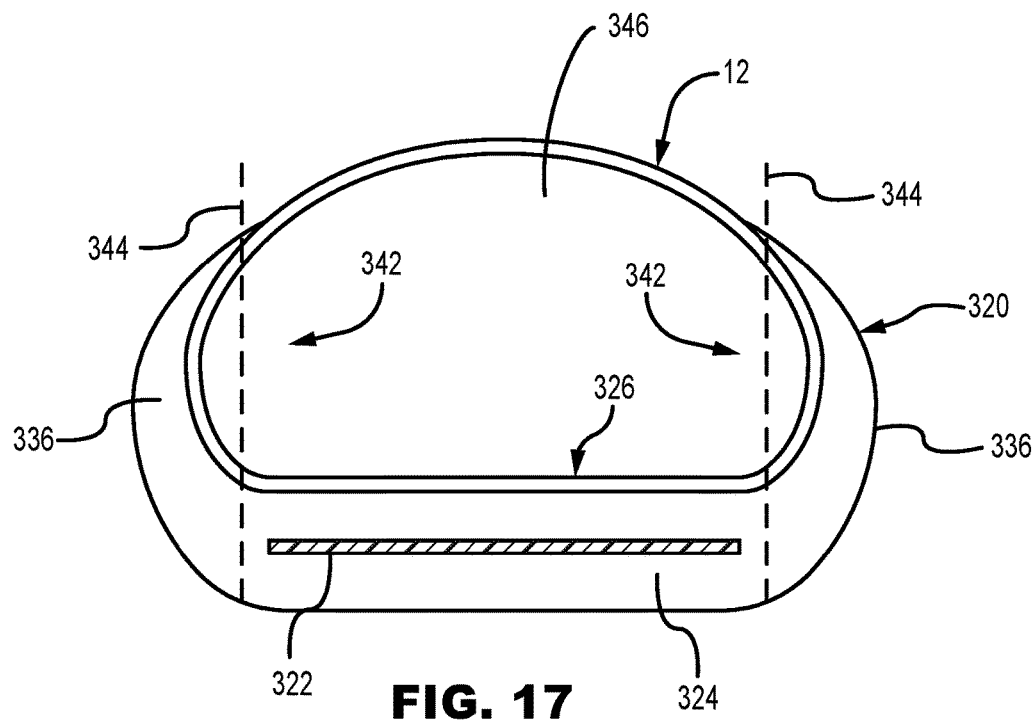
FIG. 17 is a schematic partial cross-sectional view of an article of footwear with a plate embedded in a sole structure.

While the arrangement in FIG. 16 utilizes a comparatively softer inner sole material 302 to provide an increased cushioning response and to better attenuate impact forces, in some embodiments, such as shown in FIG. 17, a sole structure 320 of the present construction may include a rigid or semi rigid plate 322 that is placed and operatively configured to inhibit bending or certain flexural motions of the sole structure 320. In one configuration, the plate 322 may be a polymeric structure that may have a substantially greater stiffness than the abutting/surrounding sole. The polymeric plate 322 may be formed from, for example, a polyamide (e.g., PA6 or PA66), polyether ether ketone (PEEK), Polyphenylene sulfide (PPS), Polytetrafluoroethylene (PTFE), and/or the like. In some embodiments, the plate 322 may be a composite structure, where a plurality of continuous or discontinuous reinforcing fibers are embedded therein. In one configuration, the plurality of fibers include carbon, aramid, or glass fibers. In one configuration, the fibers may be short fibers, each having an average longitudinal/length dimension of less than about 25 mm, or less than about 20 mm, or less than about 15 mm, or even less than about 10 mm. These short fibers may be mixed with the molten polymer and injection molded into the required shape. As such, shorter fibers are typically easier to injection mold, though are typically less strong than comparable longer fibers (greater than about 25 mm). In another embodiment, the reinforcing fibers may be continuous fibers that each extend across the plate/structure. In such an example, the fibers may resemble a fabric that is embedded in a polymeric matrix.

The plate 322 may be operative to provide structure and stability to the foam sole 320, which may be desirable and/or required during certain sporting activities. In one embodiment, the plate 322 may be located only in the forefoot portion 20, or only within the forefoot portion 20 and the midfoot portion 22. In other embodiments, the plate may only be located in the midfoot portion 22. In one configuration, the plate 322 may be fully embedded within the foam 324 used to form the sole structure 320. In one embodiment, the plate 322 from FIG. 17 may be incorporated into a multi-material design, such as shown in FIG. 16. In such an embodiment, the plate may be disposed within the outer material 304, or between the harder outer material 304 and the softer inner material 302 (i.e. to still enable the softer material to attenuate impact forces.

As an additional benefit, the use of an embedded rigid or semi rigid plate 322 may permit the sole structure to maintain a more flat-bottom type of final construction when formed into an article of footwear. This result is attributable to the vacuum forming process, where the sides would be drawn inward toward the upper. The plate 322 would prevent the under-foot portion 326 of the sole structure from taking as pronounced of a curvature as it would in a design without the plate (i.e., it would create a more definite bend-point at the outward edge of the plate while resisting curvature across the width of the plate 322).

Figure 18:
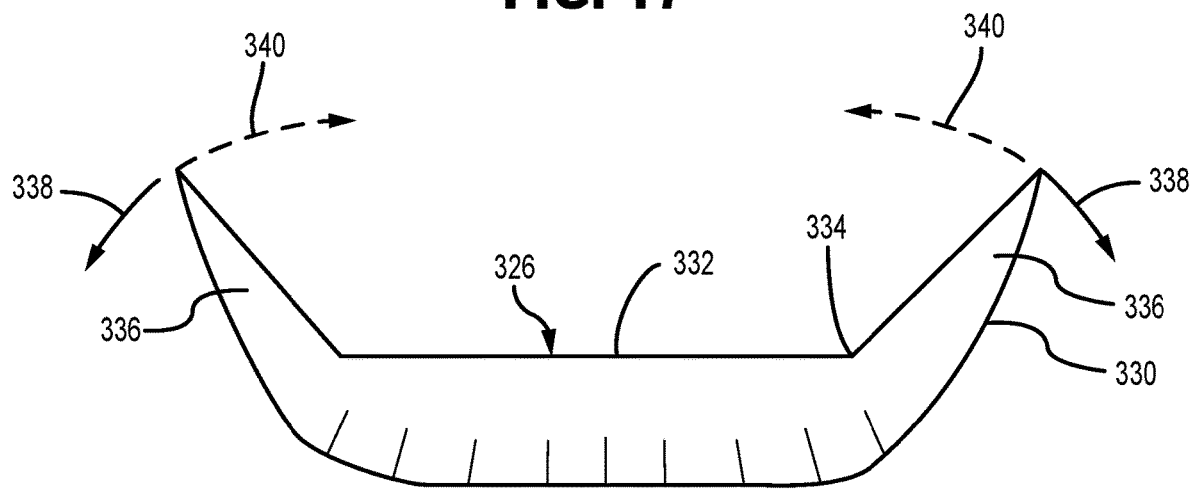
FIG. 18 is a schematic cross-sectional view of a pre-formed sole structure with a non-planar upper surface.

While the plate 322 is one approach for maintaining a flat under-foot portion 326, FIG. 18, illustrates an additional design approach that may be used to reduce any bending stresses that may urge an under-foot curvature. In one embodiment, the cross-sectional design of the pre-assembled sole structure 330 may include contoured upper surface 332 that may promote bending at the periphery of the sole. For example, as shown in FIG. 18, the upper surface may include a substantially planar underfoot portion 326 with vertices 334 disposed at the periphery of the underfoot portion 326. The vertices 334 may be sharp corners/edges or may comprise a bend with a tight radius of curvature such as less than 10 mm, or less than about 5 mm, or even less than about 2 mm. This design may result in an underfoot sole 326 being visibly distinguishable from peripheral wall portions 336 when the sole is in a pre-assembled state. During manufacture, a cylindrical roller may still apply adhesive to the upper surface 332, such as discussed above, however the roller may be required to elastically deflect the peripheral wall portions 336 downward in a first direction 338. Following the removal of the contact pressure by the roller, the peripheral wall portions 336 may return to their original, undeformed state (as represented by arrows 340).

Referring again to FIG. 17, in one configuration, the peripheral wall portions 336 may extend a sufficient distance out from the underfoot portion 326 so that, when coupled to an upper 12, the wall portions form a concavity 342 that is sufficiently large for the upper to extend within. Said another way, if positioned flat on a ground surface (i.e., such that the underfoot portion 326 is disposed between the upper 12 and the ground surface), a line/axis 344 normal to the ground surface and extending through the tip of the peripheral wall portion 336 would pass through an internal volume 346 of the upper 12 that is configured to receive a foot of the wearer.

Figure 19:
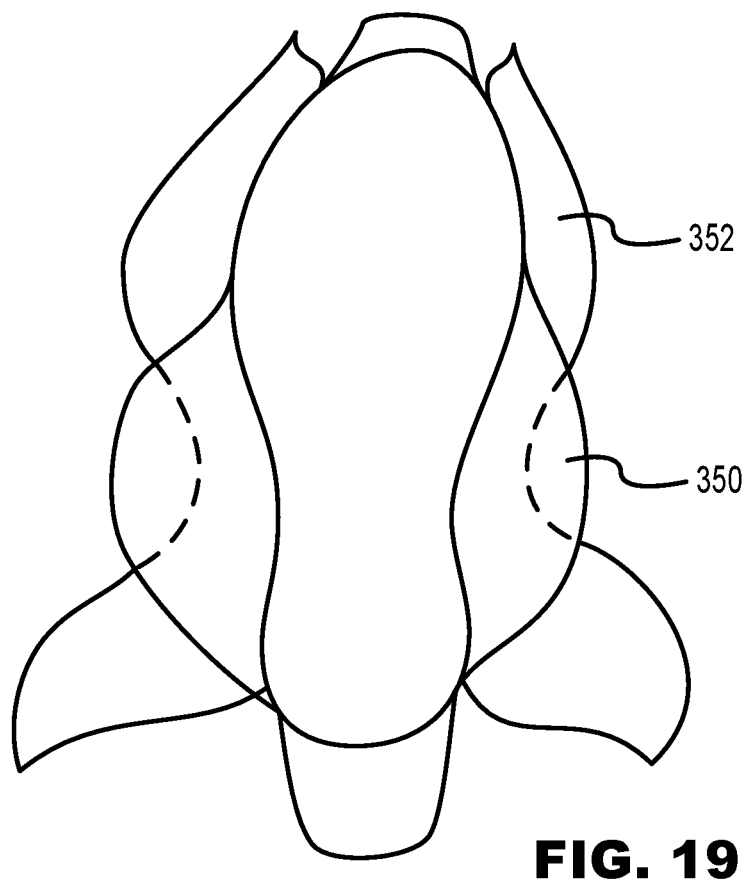
FIG. 19 is a schematic top view of a multi-layered pre-formed sole structure.
Figure 20:
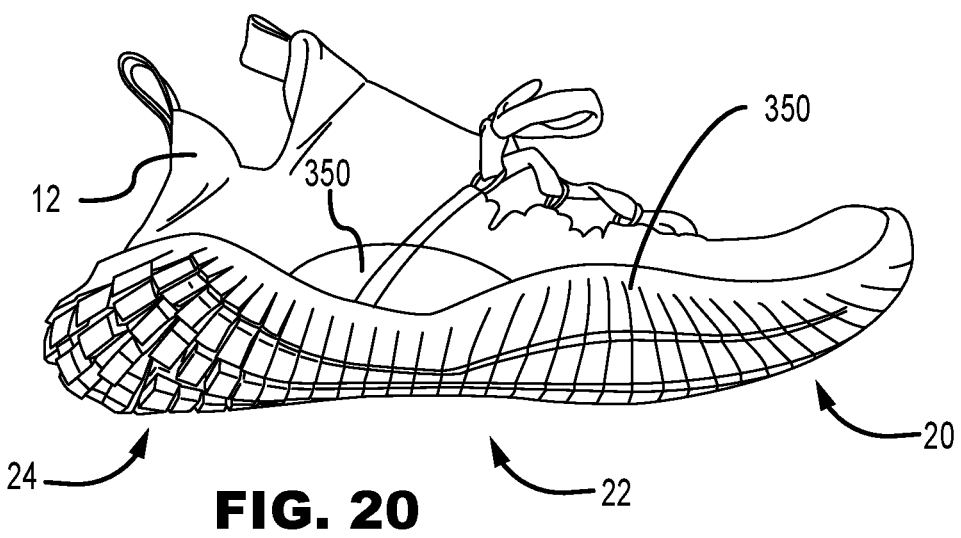
FIG. 20 is a schematic side view of an article of footwear having the sole structure of FIG. 19 formed about an upper.

While FIGS. 13-16 illustrate sole structures having nested foam layers, in some embodiments, the concept of stacked layers may be used to create new sidewall designs and/or to selectively control aspects of the footwear such as containment, support, and flexibility. For example, FIGS. 19-20 schematically illustrate one embodiment that includes at least two layers that each wrap up to cover a portion of the upper 12. In one configuration, each layer may be formed from a foamed polymer having a different hardness and/or density and may serve to provide differing degrees of lateral support. For example, a first material layer 350 may wrap upward and provide lateral support to the midfoot portion 22 of the upper 12. A second material layer 352 may then be adhered to the first material layer 350 such that when finally formed, the second material layer 352 and the upper 12 may be adhered to opposing sides of the first material layer 350. In some embodiments, this second material layer 352 may comprise a material with a greater stiffness and/or hardness than the material used to form the first material layer 350. In this manner, the second material layer 352 may serve as ankle and forefoot support, which may be desirable, for example, in a basketball shoe.

The design illustrated in FIGS. 19-20 should be understood to be an example of a multi-layered thermoplastic foam sole structure where the layers are not coextensive or simply scaled variants of each other. In other embodiments, additional layers may be present, such as an outsole layer provided on an opposite side of the second material layer 352 from the first material layer 350. In some embodiments, there may be two layers, three layers, four layers, or more, further, in some embodiments, one or more of the layers may only extend across specific portions of the sole. For example, a layer may extend across the forefoot portion 20 and heel portion 24, but be omitted from the midfoot portion 22. In some embodiments, such as shown in FIGS. 19-20, layers may extend up the sidewall of the upper to different heights thus each forming a portion of the biteline (i.e., the line on which the upper meets an edge of the sole structure on the outer surface). In the embodiment shown, the first material layer 350 may form the portion of the biteline in the midfoot region, while the second material layer 352 may form portions of the biteline in the heel and/or forefoot regions. Moreover, because the layers are not coextensive or scaled variants of each other, at least a portion of the first material layer 350 may remain uncovered by the second material layer 352, such as shown in the midfoot region of the article in FIG. 20. In other embodiments, this multi-layered design may include rigid or semi-rigid plates, or stiffening members between adjacent layers.

Figure 21:
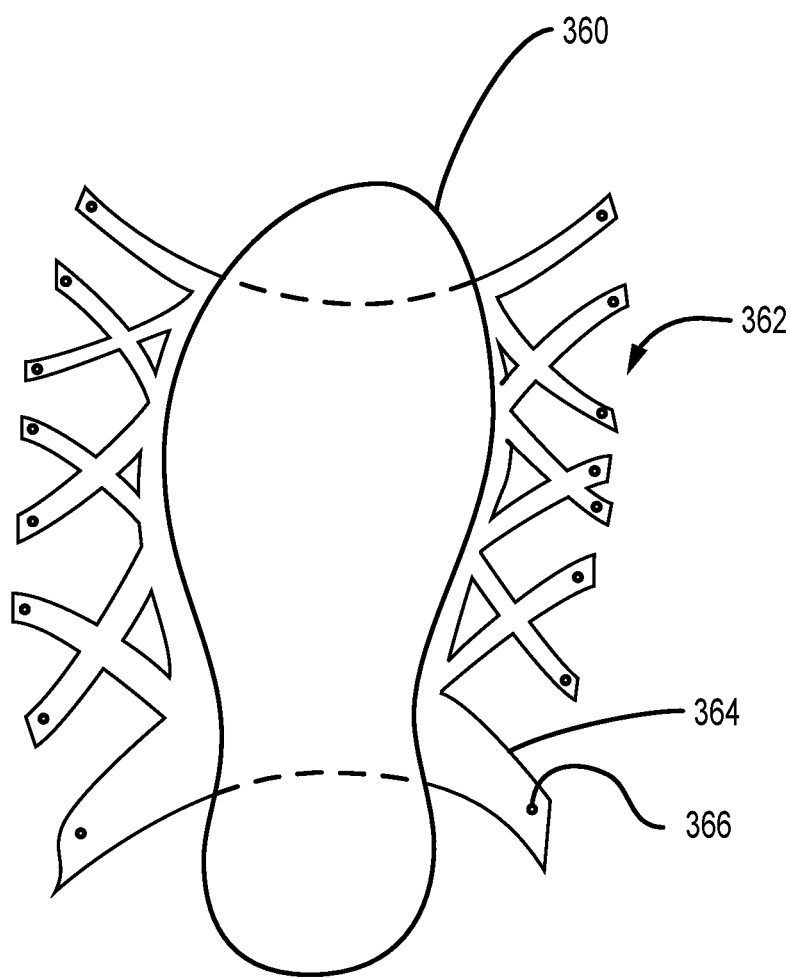
FIG. 21 is a schematic top view of a multi-layered pre-formed sole structure.

FIG. 21 schematically illustrates an embodiment similar to FIGS. 19-20, but wherein one of the layers of the sole structure 360 includes a webbing or strapping 362. In this embodiment, the webbing 362 is configured to wrap upward around a portion of the upper 12 when formed into a completed article of footwear. In one configuration of this design, the webbing 362 may serve, at least in part, as a closure mechanism for securing the upper 12 around the foot of the wearer. For example, in one embodiment, the webbing 362 may extend across the sole structure 360 from a medial side to a lateral side. When formed into a completed article of footwear, the webbing on opposite sides of the upper may be secured together over the instep. As shown in FIG. 21, in one configuration, one or more webbing members 364 may include an aperture 366 for receiving a lace. In other embodiments, straps, clasps, hook and loop fasteners, or other such footwear closure techniques may be used instead of a traditional lace.

It should be noted that the present disclosure includes all combinations of features from the above-referenced figures. For example, some or all of the siping shown in FIGS. 7-8 may be used in conjunction with the layered designs shown in FIGS. 19-21. By combining these features, a designer may be able to provide a shoe with the utmost flexibility in the longitudinal direction, while simultaneously providing the lateral foot support and containment that might be required in sports such as basketball.

The above features and advantages, and other features and advantages, of the present teachings are readily apparent from the detailed description of some of the best modes and other embodiments for carrying out the present teachings, as defined in the appended claims, when taken in connection with the accompanying drawings.

The invention claimed is:

1. An article of footwear comprising:
an upper having a ground facing surface, and opposing medial and lateral sidewalls disposed on and extending from opposite medial and lateral sides of the ground facing surface;
a sole structure secured to the upper and comprising a plurality of non-coextensive, thermoplastic foam layers, wherein each layer extends across a portion of the ground facing surface of the upper, and wherein an edge of the sole structure meets the upper to define a bite line;
wherein the plurality of non-coextensive, thermoplastic foam layers comprises at least a first foam layer and a second foam layer, and wherein:
the first foam layer has a different hardness and/or density than the second foam layer;
each of the first foam layer and the second foam layer extends into direct contact with, and is directly adhered to both the lateral sidewall and the medial sidewall of the upper; and
the first foam layer is secured to the second foam layer via an adhesive or a thermal weld; and
wherein the first foam layer forms a first portion of the biteline in a midfoot region of the sole structure, and wherein the second foam layer forms a second portion of the biteline in at least one of a heel region or a forefoot region of the sole structure; and
wherein a portion of the first foam layer remains uncovered by the second foam layer in the midfoot region of the sole structure.

2. The article of footwear of claim 1, wherein the first foam layer has a first shape prior to being adhered to the upper, and has a second shape when adhered to the upper;
wherein the first shape is different than the second shape; and
wherein the second shape is a deformed variant of the first shape.

3. The article of footwear of claim 2, wherein the first foam layer transitions from the first shape to the second shape via thermal energy and externally applied pressure.

4. The article of footwear of claim 1, wherein at least a portion of the first foam layer extends between the ground facing surface of the upper and the second foam layer; and
wherein the first foam layer extends into contact with the lateral sidewall and the medial sidewall only within a midfoot region of the upper.

5. The article of footwear of claim 4, wherein the second foam layer is directly adhered to the lateral sidewall and medial sidewall of the upper within a heel region of the upper.

6. The article of footwear of claim 1, further comprising a stiffening plate provided between the first foam layer and the second foam layer; and wherein the plate is more rigid than both the first foam layer and the second foam layer.

7. The article of footwear of claim 1, wherein at least one of the first foam layer and second foam layer comprises a sipe that has a splay such that a width of the sipe is narrower at a root of the sipe than at an outer surface of the foam layer.

8. The article of footwear of claim 7, wherein the splay is attributable to a deformation of the foam layer.

9. The article of footwear of claim 7, wherein the sipe extends entirely through one of the first and second foam layers, and further extends partially through the other of the first and second foam layers.

10. The article of footwear of claim 1, wherein the first layer is formed from a first thermoplastic material and the second layer is formed from a second thermoplastic, and wherein the first thermoplastic material and second thermoplastic material each comprise a common polymer.

11. The article of footwear of claim 1, wherein the upper does not include a strobel.

12. The article of footwear of claim 1, wherein the sole structure is thermoformed to the upper.

13. The article of footwear of claim 1, wherein the plurality of non-coextensive, thermoplastic foam layers define:
a plurality of protuberances, each protuberance having an outer face that defines a portion of the outer sole surface;
a plurality of splayed sipes extending across a portion of the sole structure, each splayed sipe extending between at least two adjacent protuberances; and
wherein each sipe of the plurality of splayed sipes has a splay attributable to a deformation of the base layer, and wherein the deformation is a result of the thermoforming of the sole structure to the upper;
wherein the plurality of splayed sipes comprises a first plurality of splayed sipes and a second plurality of splayed sipes; and
wherein each of the first plurality of splayed sipes intersects each of the second plurality of splayed sipes;
wherein at least one of the first plurality of splayed sipes has a terminus at the base layer of the medial portion and extends longitudinally from a heel region of the sole structure to a forefoot region of the sole structure; and
wherein at least one of the plurality of splayed sipes has a terminus at the base layer of the lateral portion and extends longitudinally from the heel region to the forefoot region.

* * * * *